(12) United States Patent
Welch et al.

(10) Patent No.: US 11,557,216 B2
(45) Date of Patent: *Jan. 17, 2023

(54) ADAPTIVE VISUAL OVERLAY FOR ANATOMICAL SIMULATION

(71) Applicant: UNIVERSITY OF CENTRAL FLORIDA RESEARCH FOUNDATION, INC., Orlando, FL (US)

(72) Inventors: Gregory Welch, Orlando, FL (US); Joseph LaViola, II, Orlando, FL (US); Francisco Guido-Sanz, Orlando, FL (US); Gerd Bruder, Orlando, FL (US); Mindi Anderson, Orlando, FL (US); Ryan Schubert, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 53 days.

This patent is subject to a terminal disclaimer.

(21) Appl. No.: 17/069,200

(22) Filed: Oct. 13, 2020

(65) Prior Publication Data
US 2021/0049921 A1 Feb. 18, 2021

Related U.S. Application Data

(63) Continuation of application No. 16/933,451, filed on Jul. 20, 2020, now Pat. No. 10,854,098, which is a continuation of application No. 16/537,994, filed on Aug. 12, 2019, now Pat. No. 10,803,761.

(51) Int. Cl.
*G09B 5/02* (2006.01)
*G06F 3/01* (2006.01)
*G06T 19/00* (2011.01)
*G09B 23/30* (2006.01)

(52) U.S. Cl.
CPC .............. *G09B 5/02* (2013.01); *G06F 3/014* (2013.01); *G06T 19/006* (2013.01); *G09B 23/303* (2013.01)

(58) Field of Classification Search
CPC ..................................................... G09B 5/02
USPC ......................................................... 434/268
See application file for complete search history.

(56) References Cited

U.S. PATENT DOCUMENTS

2018/0293802 A1* 10/2018 Hendricks .............. G09B 23/30
2018/0315329 A1* 11/2018 D'Amato ................. G09B 5/02

* cited by examiner

*Primary Examiner* — Thomas J Hong
(74) *Attorney, Agent, or Firm* — Anton J. Hopen; Smith & Hopen, P. A.

(57) ABSTRACT

An anatomical feature simulation unit is a physical device designed to help simulate an anatomical feature (e.g., a wound) on an object (e.g., a human being or human surrogate such as a medical manikin) for instructing a trainee to learn or practice treatment skills. For the trainee, the simulation looks like a real body part when viewed using an Augmented Reality (AR) system. Responsive to a change in the anatomic state of the object (e.g., bending a knee or raising of an arm) not only the spatial location and orientation of the anatomical feature stays locked on the object in the AR system, but the characteristics of the anatomical feature change based on the physiologic logic of changing said anatomical state (e.g., greater or less blood flow, opening or closing of a wound).

19 Claims, 21 Drawing Sheets

ADAPTIVE VISUAL OVERLAY FOR ANATOMICAL SIMULATION

CROSS REFERENCE TO RELATED APPLICATIONS

This application is a continuation of and claims priority to U.S. Non-Provisional patent application Ser. No. 16/933,451 entitled "Adaptive Visual Overlay Wound Simulation", filed on Jul. 20, 2020 which is a continuation of U.S. Non-Provisional patent application Ser. No. 16/537,994, entitled "Multisensory Wound Simulation", filed on Aug. 12, 2019 and patented on Oct. 13, 2020 as U.S. Pat. No. 10,803,761, the contents of which are herein incorporated by reference.

BACKGROUND OF THE INVENTION

1. Field of the Invention

This invention relates to medical simulations. More specifically, it relates to a system for modifying the appearance of computer-simulated anatomical features responsive to changes in an anatomical state of an object for medical training and education.

2. Brief Description of the Related Art

Combat life savers, combat medics, and medical corpsman are the first responders of the battlefield, and their training and skill maintenance is of preeminent importance to the military. While the instructors that train these groups are highly competent, the simulations of battlefield wounds are constructed from simple static moulage including fake blood that instructors apply immediately prior to training. The simplicity of the presentation often requires the instructor to describe the wound or remind the trainee during an exercise about the qualities of the wound that are not represented in the wound presentation, including how the wound is responding to treatment. This added effort decreases time that could be spent providing instruction, increases noise into the cognitive process, and interferes with the flow of the trainee experience. Even these simple simulations take time and effort to create, set up, and manage, before and during the training exercise.

The preparation time and overall compressed schedule of a training course means that trainees get limited hands-on practice in realistic settings. While dynamic computer-based simulations have been available for some time, virtual training in front of a 2D computer screen or even in a full virtual reality environment does not provide the trainee with the same experience as hands-on training with moulage wounds on physical bodies. Typical field training is even more simplistic: the state of the art is still a "casualty card" that tells a "casualty" actor how to portray a wound specified on the card, and the trainee sees at best static moulage and fake blood as a portrayal of the wound.

Existing simulated wound systems fall into two main categories. First, there exist purely physical wound models such as those made from colored rubber. These are static, both visually and behaviorally. Second, there exist virtual wound models rendered by computer graphics. These can look realistic when viewed through a tracked stereo head-worn display for example, but because they are purely virtual they cannot be manipulated as physical entities.

There are several challenges with current headset/HMD-based augmented reality systems on the market, portable or wearable systems, including their form-factor (many are bulky and uncomfortable), their limited computing power, and (perhaps the most apparent) their typically limited fields of view. All these limitations make for a constrained immersive experience that must be accounted for when designing an augmented reality application, especially one meant for immersive training.

Virtual wound systems could simulate some degree of tactile sensation via actuated tactile gloves. What is needed in the art is moving the tactile aspects back into the wound (as with the physical wound models), thus supporting manipulation via un-adorned hands, while still supporting the dynamic virtual aspects.

BRIEF SUMMARY OF THE INVENTION

Augmented Reality (AR), especially the proliferation of wearable AR headsets, glasses, or head-mounted displays (HMDs), has the potential to revolutionize casualty care training in both military and civilian circumstances. AR provides a unique mix of immersive simulation with the real environment. In a field exercise, a trainee could approach a casualty role-player or mannequin and see a simulated wound rendered in an AR headset appear registered on the casualty. This combination of hands-on, tactile experience with the real world on the one hand, and simulated, dynamic wounds and casualty responses on the other, has the potential to drastically increase the realism and overall quality of medical training. A system that can additionally provide automated instruction could enable anytime/anywhere training and reduce the burden on instructors.

The present invention is composed of several technologies focused on enhancing the multi-sensory training experience. This includes AR technology to enhance the visual aspects of training—portraying wounds in ways that not only look more accurate but also exhibit the dynamics of real wounds, including their progression over time and their responses to treatment. This includes leveraging the moulage that is used today to provide the passive haptic sensations of wounds, while extending this moulage with active features. These enhancements include using embedded actuators that can provide more realistic haptic effects associated with pulse, breathing, and specific wound features such as discharging liquid that—when combined with visuals—is perceived as blood; and embedded sensors to facilitate dynamic responses to the treatments the trainee is administering to the wound.

A TVW is shaped to match the size and shape of a wound, e.g., a puncture, stab, slice, tear, abrasion (i.e., road-rash), lacerations, or avulsions. The device may be pliable or may include pliable components that support the device being affixed to a curved real or simulated human (or animal) body surface, such as an arm or leg. The outer surface of the device is made to feel like skin, for example using a silicon-based material. In an embodiment of the invention, the outer surface of the device is covered with markers or patterns that are detectable (observable) to a sensing system, but generally imperceptible to a human, to facilitate dynamic computer vision (camera) or other sensor-based localization in 3D position and 3D orientation, as well as shape deformation estimation, e.g., to estimate the device shape deformation resulting from the adherence to a curved body part, or dynamic manipulation by a trainee (e.g., squeezing a wound to close an opening). The markers or patterns could be passive, e.g., painted or colored material, or active, e.g., using LEDs, photosensors, magnetic coils, or other active electronic components that facilitate the localization and deformation estimation. In an alternative embodiment of the invention, two layers of markers overlay where the material itself partially opaque allowing for some additional estimation of deformation of the wound. This may be achieved by either differences in deformation of the two layers or changes in the interference pattern between to the two layers.

The device may contain sensors, e.g., pressure sensors distributed over or within the device, e.g., to measure forces applied by a human practicing the application of pressure to stop bleeding, e.g., to affect visual and physiological simulations, or inertial or magnetic sensors to help in estimating the device position and orientation. For example, an embodiment of the invention may detect pressure by resistive, capacitive, or other material affixed inside or on the bottom of a simulated physical wound. The device may contain actuators or sources, e.g., to emit sounds, smells, or liquids; or to produce or simulate small movements associated with the wound, e.g., tremors or agitation. The device may contain or be associated with a processor that could, e.g., perform estimation, control, computation, and communication. The device may contain or include wireless communication capabilities such as Bluetooth or similar. The device may be powered by batteries, e.g., rechargeable batteries with an inductive charging capability, or connected directly to an external power source.

When applied to a simulated patient (real human or manikin) and activated, the AR system continuously tracks the TVW with respect to the AR headset (glasses or HMD), estimates the deformation, measures the sensors (applied pressure, etc.), renders (via computer graphics) an appropriate dynamic view of the simulated wound, and affects all appropriate actuator outputs. For example, the trainee might see (in his/her AR headset) what appears to be blood flowing out of the wound, as the vital signs "drop," then as increasing wound pressure is applied by the trainee (e.g., as determined by the pressure sensors), the apparent rate of the blood loss (as rendered by the AR system) would slow, and the physiological simulation would reflect stabilized vitals, etc. Real-time depth or other models of the trainee's hands, medical devices, etc. could also be used to affect the simulated visuals generated by the AR rendering system. For example, blood could be made to appear to flow out of the wound and over the hands, until appropriate pressure is applied at which time the blood flow would halt, and the remaining blood would stabilize, etc. A liquid reservoir and pump may be affixed on or within the corporeal object, the pump communicatively coupled to the computer processor, wherein liquid from the reservoir is pumped to and emitted by the wound, to simulate bodily liquid consistent with the simulation. The liquid may be chroma-keyed (e.g., blue or green) so that the computer processor may recolor and/or texturize the fluid in alignment with the simulation. Alternatively, or in conjunction, the pump or secondary pump may atomize fluid to create smells consistent with the simulation.

An embodiment of the invention could model various wound characteristics such as eschar tissue or different levels of depth in a burn wound, e.g., a blast casualty injury compounded with burns. In yet another embodiment, a 3D model of the corporeal object is accessible by the computer processor wherein the software process reconstructs the spatial and dimensional parameters of both the visual graphic enhancements and the 3D model of the corporeal object for the augmented reality mechanism wherein the optical image of the corporeal object is spatially and dimensionally aligned to the 3D model wherein the 3D model may be rendered opaque or semi-transparent via the augmented reality mechanism. One or more glove indicia on one or more trainee-worn gloves engage the corporeal object and simulated wound, the computer processor further accesses a 3D glove model wherein the glove indicia convey the orientation, location and articulation of trainee hands to dynamically align the 3D glove model with the trainee hands. The computer processor may chroma-key the trainee-worn glove so that their optical image opacity may be modified.

BRIEF DESCRIPTION OF THE DRAWINGS

For a deeper and more complete understanding of the invention, reference should be made to the following detailed description, taken in connection with the accompanying drawings, in which.

DETAILED DESCRIPTION OF THE PREFERRED EMBODIMENT

Figure 1:
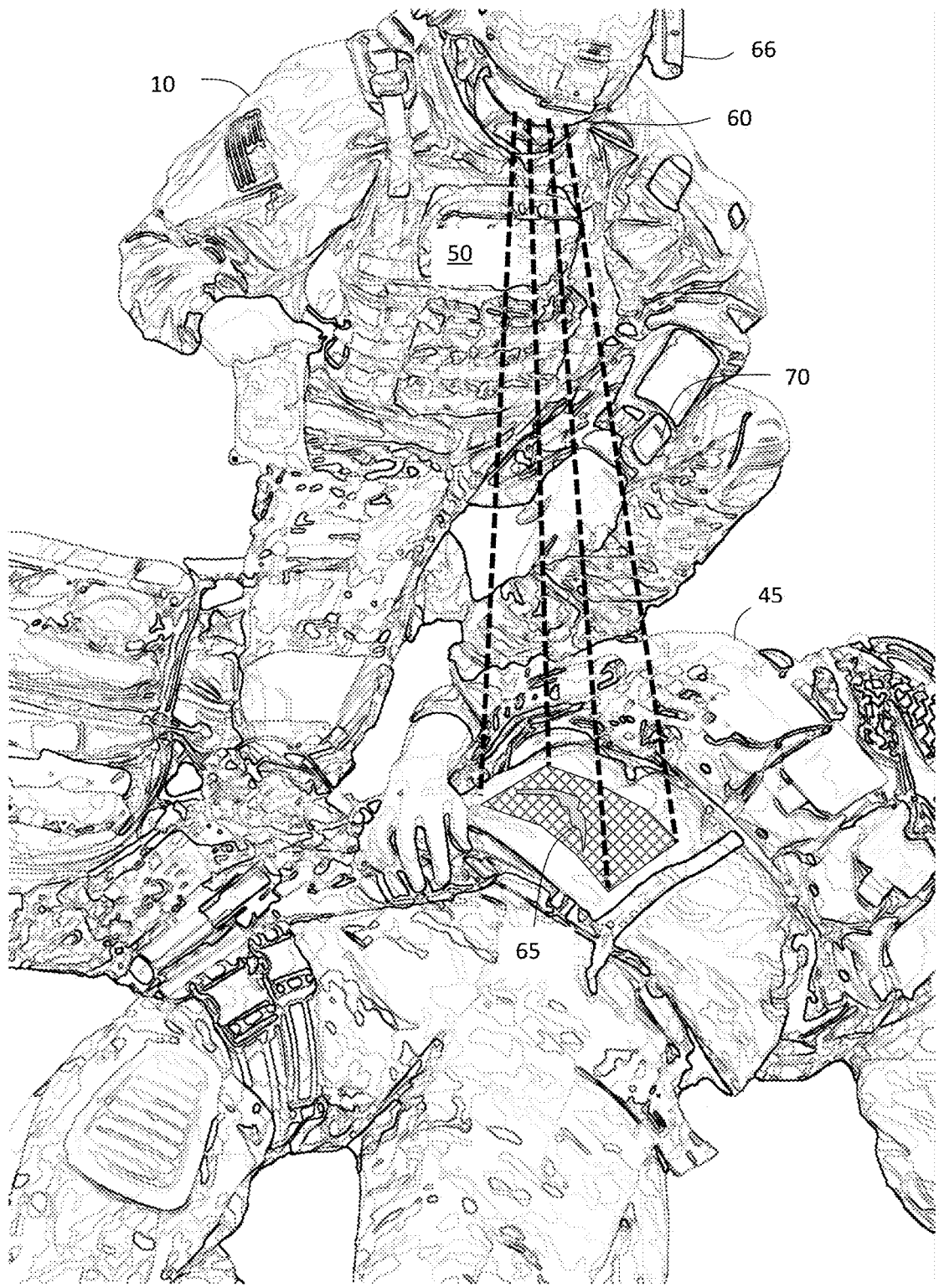
FIG. 1 is an enhanced photographic image of a military medic simulation according to an embodiment of the invention.

FIG. 1 shows a photographic image of a military trainee 10 and simulated casualty 45 wherein AR glasses (or AR headset/HMD) 60 and sensors 66 on trainee 10 render wounds 65 over static moulage on casualty 45. A portable computer 50 on the trainee's body processes data from the casualty 45 and trainee 10 to enhance the simulation. For example, vitals may be rendered in a heads-up display through the AR glasses 60 on the trainee 10 or on a wrist-wearable display 70. As trainee 10 performs medical procedures on casualty 45, casualty 45 sends data to portable computer 50. The data may be responsive to several sensors including pressure, limb manipulation, temperature, light, and the like. The sensor data is processed on portable computer 50 wherein the wounds and associated visuals 65 rendered in AR glasses 60 change in accordance with the sensor data.

For example, casualty 45 detects pressure over simulated wound 65. Portable computer 50 then modifies AR rendering 65 to decrease or stem the simulation of blood flowing out of the wound. Embodiments of the present invention may further add more depth to this simulation. A fluid reservoir and pump inside the casualty 45 may respond to instructions from portable computer 50 to increase, decrease or stop the flow of fluid used to simulate blood pressure within the vascular system and changes in pressure throughout a training simulation. One embodiment of "simulated blood" includes the rendering of virtual blood visually, while optionally emitting a very slight amount of liquid (e.g., water or Glycerol) to give a tactile sensation of the visually apparent "blood." The liquid does not necessarily have to match real blood in terms of consistency, color, or amount to potentially still be effective. Therefore, trainee 10 does not just have the visual rendering of the wound, but also the tactile and temperature kinesthetic feedback from the bodily fluid.

Continuing along the same example, should trainee 10 stem the blood flow then the vitals rendered in AR glasses 60 or display 70 are modified by portable computer 50 consistent with decreasing blood loss. Yet another enhancement may include audio feedback. This may be from casualty 45 itself having an embedded speaker or the audio may be sent to headphones, headsets, earbuds or separate speaker for trainee 10. The audio may include groans, speech or the like stemming from casualty 45. The audio may also be used to affect tactile or haptic sensations that are felt not heard.

In the event the pressure applied to the wound is excessive (as detected by the pressure sensor in or on casualty 45) then audio feedback indicating pain is sent according to logic followed by portable computer 50. By the same token, pain or other conditions may induce shaking or movement within a real patient. Therefore, casualty 45 may include a vibrational motor controlled by portable computer 50. Such a motor may include an eccentric rotating mass vibrational motor, a linear resonant actuator, or the like.

An advantage of the invention is the multi-sensory approach to both virtual reality enhancements and to non-computer-enhanced aspects such as fluids, movement, and temperature. Going back to the example of pain simulation, not only could casualty 45 tremble from the vibrational motors, the AR glasses could render a face upon casualty 45 grimacing in pain. Responsive to the actions of trainee 10 to mitigate the pain, the casualty's computer-generated face could soften its features to show casualty 45 is more comfortable.

Figure 2:
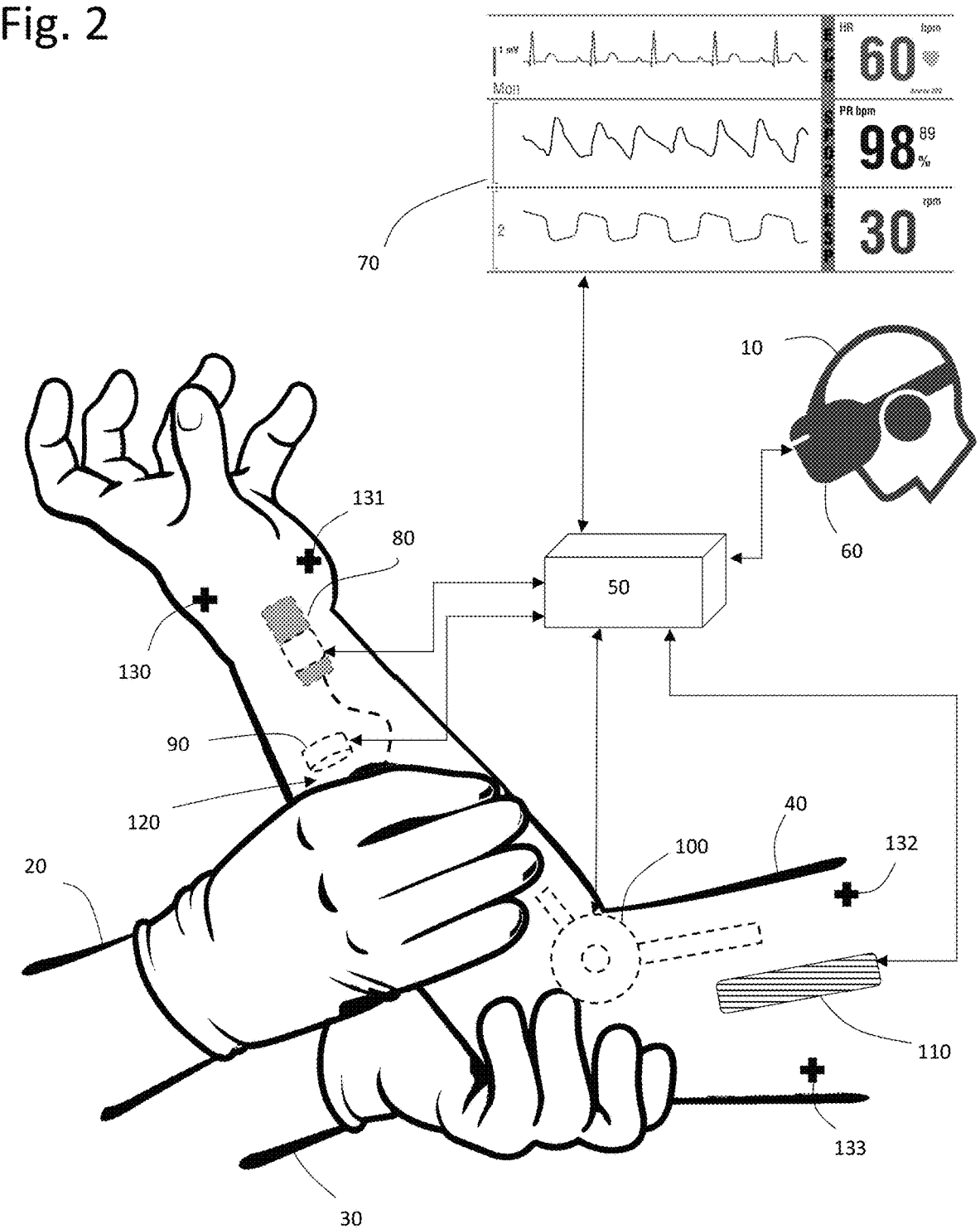
FIG. 2 is a partially sectional, side-elevation, partially diagrammatic view of an embodiment of the invention.

In FIG. 2, a trainee 10 manipulates an artificial limb 40. Trainee 10 wears an AR headset 60. Headset 60 is communicatively coupled to computer 50. Computer 50 may be portable, non-portable, on premise or remotely located but communicatively coupled to local components. Trainee manipulates limb 40 with trainee hands 20 and 30. Indicia 130, 131, 132, and 133 on limb serve as reference points for headset 60 to render AR wound enhancements to trainee 10. In this example, the forearm of limb 40 is wounded and trainee 10 seeks to stem the flow of simulated blood 120. To enhance the simulation, fluid reservoir/pump 80 is communicatively coupled to computer 50 wherein computer 50 may cause pump to push simulated blood or other fluid to wound in forearm. Trainee 10 senses the fluid not only visually but by its tactile and temperature change through hand 20. Pressure sensor 90 is communicatively coupled to computer 50. Responsive to increased pressure by hand 20 on wound, computer 50 may adjust the amount of fluid pushed through pump 80. Sensor 100 may detect limb articulation and/or elevation of forearm. Thus, sensor 100 communicates to computer 50 that trainee 10 has elevated forearm and computer 50 then adjusts the amount of fluid pushed through pump 80.

Vibrational motor 110 is communicatively coupled to computer 50 which directs motor 110 to actuate responsive to the simulation of tremors or discomfort.

Vital sign display 70 is communicatively coupled to computer 50 which assimilates data received from sensors, trainee 10, and the simulation scenario itself to present vital signs indicative of the patient's status. The vital sign display 70 may be rendered to headset 60 or may be an external display visible to the trainee 10 and/or supervising instructors.

Figure 3:
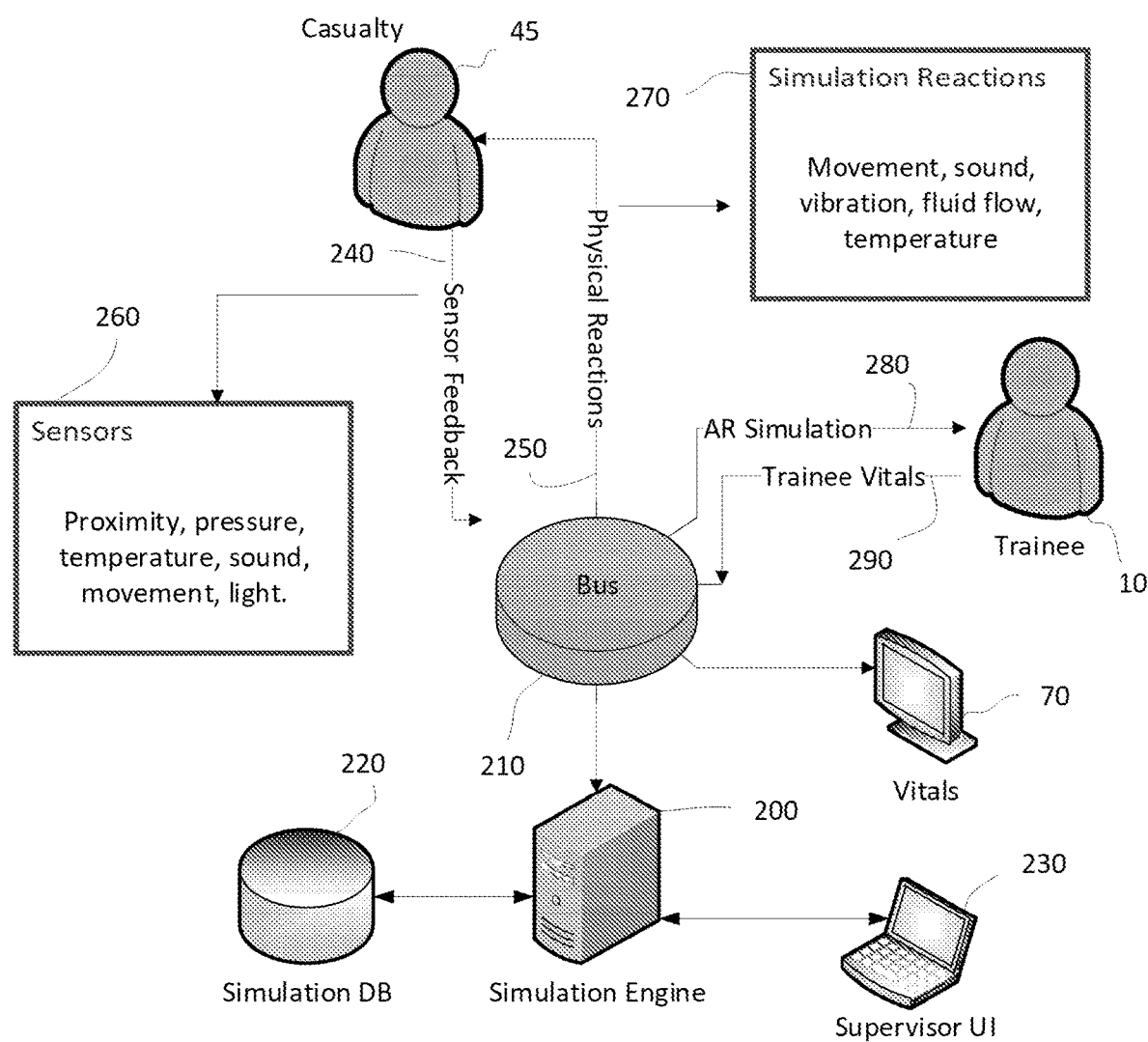
FIG. 3 is a diagrammatic view of an embodiment of the invention.

In FIG. 3, trainee 10, casualty 45, and simulation engine 200 are communicatively coupled through data bus 210. Simulation engine 200 processes functions and procedures responsive to sensor feedback 240 from casualty. Array of sensors 260 may detect proximity, pressure, temperature, sound, movement, and light. Data bus 210 may be communicatively coupled by wired cables or wireless protocols. Simulation engine 200 accesses simulation database 220 which stores one or more simulations. Logic in simulation engine 200 varies the simulation through several means including transmitting modifications to the augmented reality output 280 to trainee 10, modifying vitals 10 of casualty 45 and generating, modifying, or ceasing physical reactions 250 on or within casualty 45. Array of simulation reactions 270 include movement, sound, smell, vibration, fluid flow, and temperature.

In an embodiment of the invention, trainee vitals 290 may be received by simulation engine 200 which modifies the simulation based on the state of the trainee 10. For example, trainee vitals 290 indicate trainee 10 has an elevated pulse rate from the simulation. This may cause simulation engine 200 to modify the simulation to create a direr situation for casualty 45 to further test the ability of trainee 10 to deal with stress. In yet another embodiment of the invention provides supervisor user interface 230 that allows a trainer to override certain automated aspects of the simulation engine to test and directly observe the competency of trainee 10 and/or further instruct trainee 10. For example, supervisor user interface 230 could "freeze" the simulation so that an instructor can step into the simulation and assist the trainee 10 in a procedure or technique.

Figure 4A:
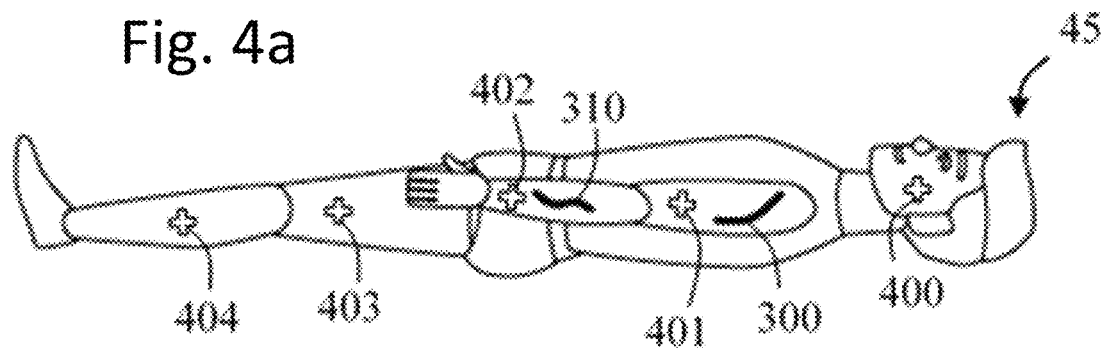
FIGS. 4a-c are side elevation views of a simulated casualty wherein limb articulation changes not only the AR wound positioning but state as well.
Figure 4B:
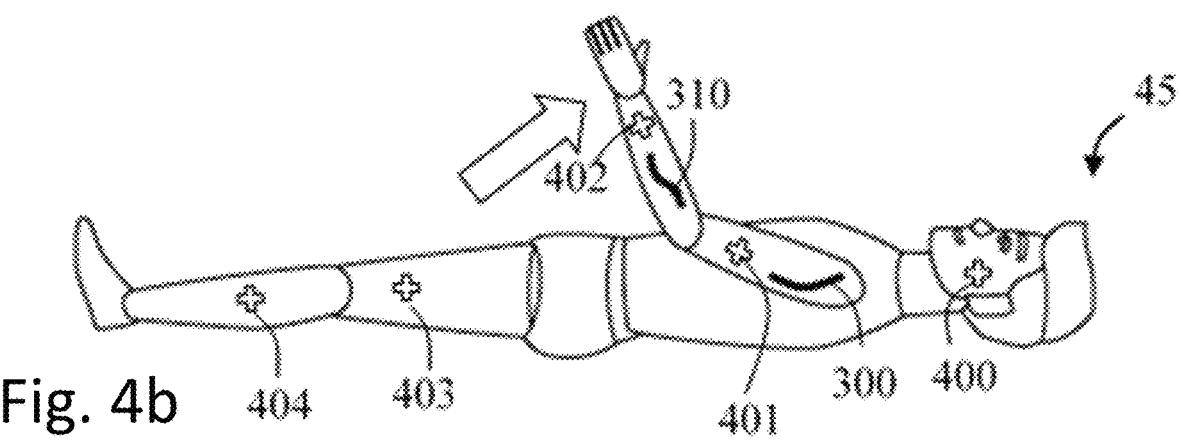
Figure 4C:
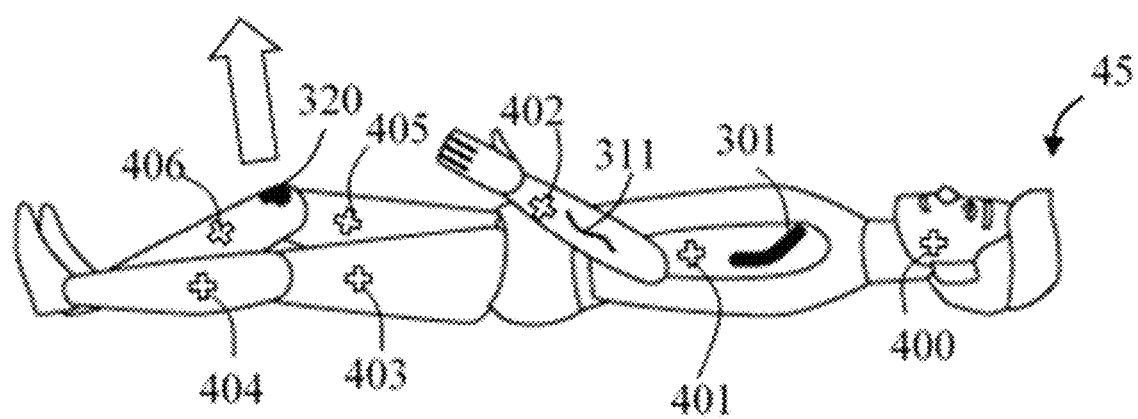

In FIG. 4a casualty 45 rests on his back. Indicia are affixed on his left cheek 400, upper left arm 401, lower right arm 402, right thigh 403 and left lower leg 404. For the purposes of this illustration, indicia 400-404 are visually discernable. However, indicia may be invisible to the human-detectable light spectrum and detected in other wavelengths such as UV or IR reactive dyes such as described in U.S. Pat. No. 8,653,445, or magnetic or otherwise imperceptible. This may be advantageous when casualty 45 is a manikin that is sought to be realistic without the distractions of visual indicia. As noted previously, the indicia establish the topology of the casualty 45 so that AR graphic enhancements may be computationally sized, orientated, positioned, and warped as the trainee and/or casualty 45 is moved, engaged, responds or is otherwise deformed. Simulated AR wound 300 is located on the upper left arm and simulated AR wound 310 is on the lower left arm. As the left arm is raised in FIG. 4b, the AR rendering of wounds 300 and 310 are repositioned, orientated, and warped in synchronization with the physical embodiment of casualty 45. An embodiment of the invention applies physiological or other relevant logic to casualty 45's wounds responsive to treatment. In the case of FIG. 4c, the left arm is slightly lowered with respect to FIG. 4b and AR rendering of wound 310 is reduced in intensity to wound 311 on the lower left arm. The AR rendering of wound 300 on the upper arm in FIG. 4b is intensified as shown in FIG. 4c as wound 301. Thus, the trainee's articulation of the left arm produces immediate effects on the AR simulation which dynamically adjusts to physiologic parameters. Also shown in FIG. 4c are indicium 405 on the upper right leg and indicium 406 on the lower right leg with wound 320 rendered on the right knee.

In an alternative embodiment of the invention, mechanical sensors detect the articulation of the limbs and communicate data to the AR generation application to size, orient, place, and warp graphic enhancements at the appropriate location. In yet another alternative embodiment of the invention, shape detection of the anthropomorphic shape of the casualty itself obviates the need for separate indicia.

Figures 5A, 5B:
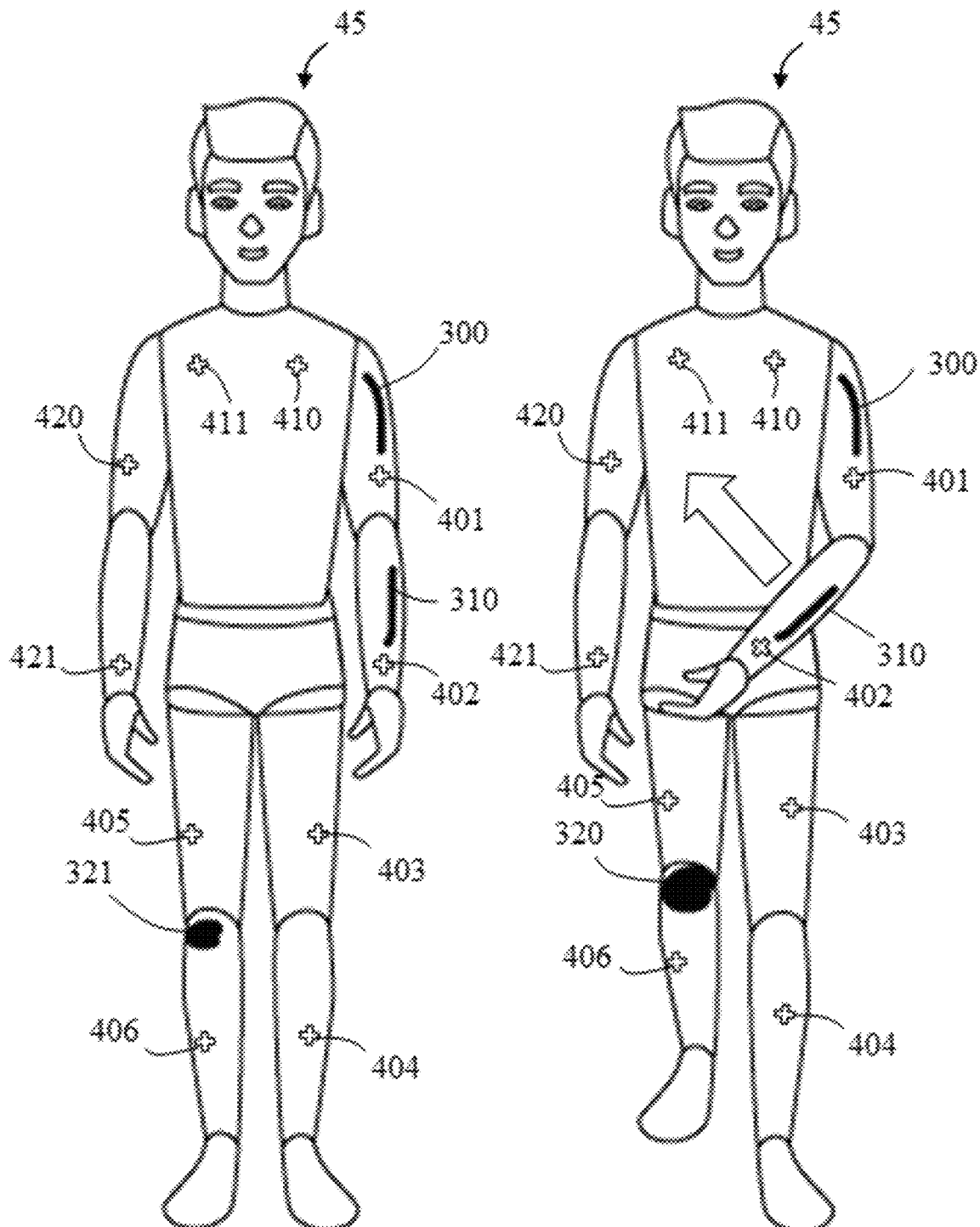
FIGS. 5a-b are front elevation views of a simulated casualty wherein limb articulation changes not only the AR wound positioning but state as well.

In FIG. 5a-b, indicia 410-411 are affixed to the chest of casualty 45. Indicium 420 is affixed to upper right arm. Indicium 421 is affixed to lower right arm. In FIG. 5a, right leg orientation is straight and AR rendered knee wound 321 is displayed. However, in FIG. 5b, right leg is bent which would physiologically open a wound on the knee by pulling back skin from the thigh and shin. Accordingly, AR rendered wound 320 is larger in size in FIG. 5b than knee wound 321 displayed in FIG. 5a. Thus, an embodiment of the present invention does more than simply reorient the spatial and dimensional features of the AR rendering over casualty 45 but also modifies the AR rendering in accordance with the physiology of treatment of the casualty 45. In addition to changes in the AR rendering, tactical, auditory and other sensory feedback may be generated. Additional examples include, but are not limited to, increased bleeding, decreased bleeding, changes in vital signs, auditory output, olfactory output (e.g., the smell of burnt flesh), respiratory movement changes, limb movements, and the like.

The present invention may be integrated with medical simulation physiological engines such as those provided under the BIOGEARS and PULSE PHYSIOLOGY ENGINE brands to provide bidirectional communication between the casualty 45, the trainee, and extrinsic peripherals such as vital signs monitors.

It should be noted that in addition to a manikin, this technology may be applied over a living human subject, e.g., a role player or standardized patient. For example, a silicon moulage with sensors and tactile feedback components (e.g., pumps, vibrational components, etc.) may be affixed to the limbs, head, torso or extremities of a living subject for the simulation. This may reduce the size and cost of the simulation equipment and allow for greater portability. Obviously, sensors and response actuators would not be embedded in the human subject but within the moulage temporarily affixed to the subject during the simulation exercise. Reference indicia may be removable adhesive stickers on the living subject or simply affixed to the removable moulage.

Incision and Puncture Embodiment

In an embodiment of the invention, a manikin includes a surface comprised of skin-like material that may be cut with a scalpel or injected with a syringe giving full, tactile feedback to the trainee. The manikin surface may be comprised of a self-healing polymer material infused with nickel atoms which not only reconnect after separation, but interpret altered electrical flow from touch, cut and injections to localize the area of engagement. Any number of self-healing materials may be used. For example, a fluorocarbon-based polymer with a fluorine-rich ionic liquid may be used wherein the polymer network interacts with the ionic liquid via highly reversible ion-dipole interactions, which allows it to self-heal. Additional variations include polypyrrole (PPy) nano wrapped in the cellulose surface and immobilized Fe3O4 magnetic particles; rubber particle reinforced epoxy organic nano self-repair; and nickel dendrites and bristle graphene. Pressure sensing may be done by a resistive or capacitive material put inside or on the bottom of the wound.

Embodiments of the invention may be tactile or non-tactile. For example, an embodiment employs a "virtual scalpel" or "virtual syringe" that creates indicia detectable by a camera (on the headset or otherwise) when used in a manner imitating the real device. The indicia are visible or invisible to the trainee but would invoke the AR simulation localized in that area. In a rudimentary form, the "scalpel" could be a green dry erase marker. As the trainee drags the marker across some skin the camera detects the green color and automatically knows that it is an incision. The simulation then creates an AR rendering (e.g., separation of the skin) which the trainee may further engage with. The marker in this embodiment provides a distinct chroma key for which simulations may be presented. However, this embodiment is tactile in the sense that the trainee's marker puts pressure on the surface of the manikin but non-tactile as to the cutting of the skin. Accordingly, based on the needs of the simulation, resources available, and training requirements, the level of tactile feedback may be varied according to the present invention.

Indicia on the syringe convey the distal tip of the needle lumen so the AR simulation understands its spatial location and orientation. A pressure tip on the syringe fires an injection event and since the software knows where the syringe is it can render AR at the correct injection site. This embodiment uses optically detected indicia but may also convey tactile feedback to the trainee as well.

Thus, simulating cutting or injection in general may be accomplished by tracking surgical devices and/or physical props used as stand-ins for those devices. Furthermore, an alternative embodiment may be achieved by tracking the props (and therefore knowing the time-varying locations of the simulated scalpel edge or syringe needle). Simulated cutting or injections are therefore accomplished by optical marking/tracing means. In yet another embodiment, simulated cutting or injections may also be achieved by other prop tracking mechanisms (e.g., optical, magnetic, acoustic, inertial, or other means).

An important aspect of using a real scalpel or syringe is the tactile sense of the actual injection of a needle into a skin/body-like material, and cutting into something, where the simulated visuals correspond. Accordingly, an alternative embodiment to self-healing material may include replaceable sheets of silicon "skin" used for cutting, injecting, and suturing according to the invention.

Reduction to Practice

Prototyping efforts focused on a simulation of instrumented moulage including visuals presented through an Augmented Reality (AR) Head-Mounted Display (HMD), and a connected device platform allowing bi-directional communication between a miniature computer and a computer controlling the visuals on the HMD.

A proof-of-concept bi-directional Bluetooth control/effect prototype was based on an HMD from Microsoft Corporation under the brand MICROSOFT HOLOLENS and a connected device using an ARDUINO minicomputer equipped with an HC-06 Bluetooth shield to act as a basic Internet of Things (IoT) device. ARDUINO is a brand-identifier for an open-source hardware and software company, project and user community that designs and manufactures single-board microcontrollers and microcontroller kits for building digital devices.

UNITY is a cross-platform game engine developed by UNITY Technologies. The UNITY engine supports more than 25 platforms and is used to create three-dimensional, two-dimensional, virtual reality, and augmented reality games, as well as simulations and other experiences. The UNITY graphics engine was used as the integrated development environment and as the rendering system for the HOLOLENS. To be able to harness the HOLOLENS' Bluetooth capabilities, the .NET 4.6 framework developed and maintained by Microsoft Corporation was used within the UNITY environment. Using .NET 4.6 provided advanced synchronization protocols, which was important to using the HOLOLENS' Bluetooth API in combination with the ARDUINO. Using Bluetooth, the device was synchronized with the HOLOLENS, whereas TCP/IP and UDP were used to communicate data to and from the connected device. Initial tests included comparing packet loss and latency in different situations and environments, which resulted in subsequent initial optimization efforts of the packeting systems.

Figure 6:
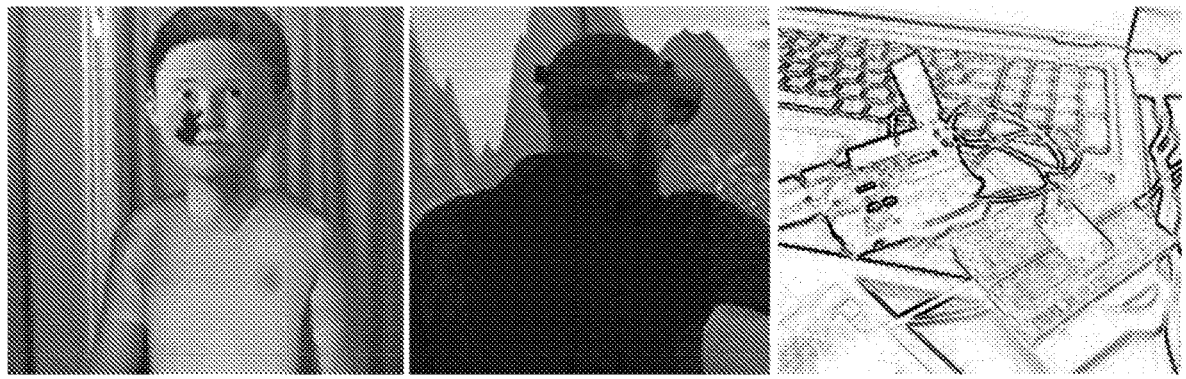
FIG. 6 (left) shows an augmented reality character of a virtual child with a nose wound in a concept HOLOLENS application; (center) a user wearing a HOLOLENS inside the Human-Surrogate Interaction Space (HuSIS) at the University of Central Florida Synthetic Reality Lab (SREAL); and (right) an ARDUINO board equipped with an HC-06 Bluetooth shield.

We then attached a basic capacitive touch sensor to the ARDUINO. The touch data received from that sensor was streamed from the device to the HOLOLENS once the touch such as from a finger (e.g., pressing on a wound) was detected. This transmitted data then triggered a state change in the UNITY graphics engine on the HOLOLENS. In this prototype, the virtual content displayed on the HOLOLENS consisted of a rigged and animated three-dimensional character of a child (see FIG. 6), which was available through in-house developments at SREAL. The character appearance and animation were modified to include a nose wound, which emitted AR blood in varying strengths until the user wearing the HOLOLENS would reach toward the nose and press their finger on the wound to stop the bleeding. In this artificial scenario, the ARDUINO and touch sensor were placed at the approximate location where the nose of the AR child was located, such that a light touch on the AR wound would stop the bleeding, whereas lifting the finger from the touch sensor would result in the bleeding to resume (see FIG. 6). FIG. 6 (left) shows an AR character of a virtual child with a nose wound in a proof-of-concept HOLOLENS application. FIG. 6 (center) shows a user wearing a HOLOLENS inside the Human-Surrogate Interaction Space (HuSIS) at SREAL. FIG. 6 (right) shows a for-development ARDUINO board equipped with an HC-06 Bluetooth shield.

Alternative embodiments to improve this approach include replacing the touch sensor with pressure sensors such as from ADAFRUIT or more flexible pressure-sensitive material such as VELOSTAT, and different silicone-based coating materials, into which a miniaturized version of the connected device can be embedded. Additional components can be embedded into the moulage to exert physical changes of the shape of the artificial wound and to change the tactile feedback provided while touching the moulage such as via small actuators or vibration motors connected to the ARDUINO.

Wound Tracking

Using computer vision libraries such as VUFORIA, OPENCV, or VISIONLIB, natural features or pre-placed markers can be tracked by means of digital image processing and computer vision algorithms. Various issues with tracking image-based markers exist, such as the proximity of the marker to the camera, deformations, occlusions, and lighting conditions. Multiple different approaches can address some of these challenges.

Patterning the Wound

Figure 7:
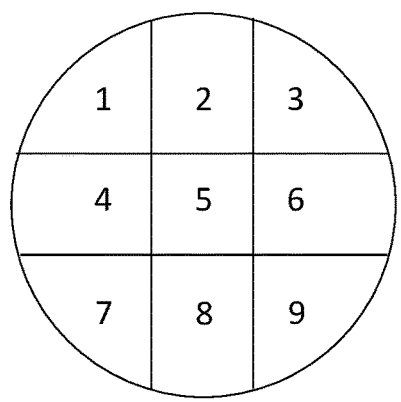
FIG. 7 shows an illustration of an image pattern approach for a circular gunshot wound, i.e., patterning the wound and periphery with several (possibly distinct) images.

This approach involves patterning the wound with several (possibly distinct) images, which allow an AR HMD with inside-out cameras (such as the HOLOLENS or META2) to be able to find the wound in a variety of deformations and angles. In particular, we make use of a multi-scale approach, which means we first try to find a marker in the camera image consisting of the whole image #1-9 (see FIG. 7). Conversely, in case of occlusions, close proximity, or in case the marker is distorted and loses its overall coherence, we can track individual self-sufficient parts. For instance, if the wound is deformed (e.g., wrapped around an arm) and the HOLOLENS can only see #1, 2, and 3, it may still be able to find these smaller regions.

Border Markers

Figure 8:
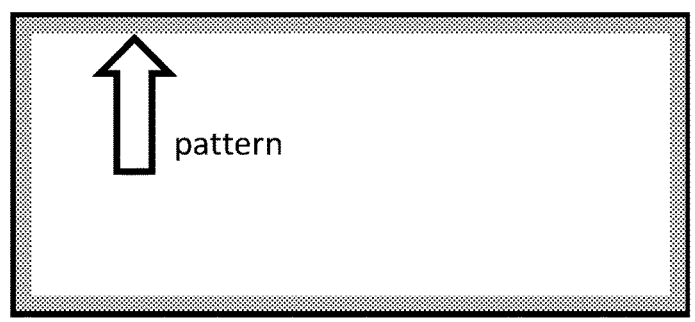
FIG. 8 is an illustration of the border tracking approach according to an embodiment of the invention.
Figure 9:
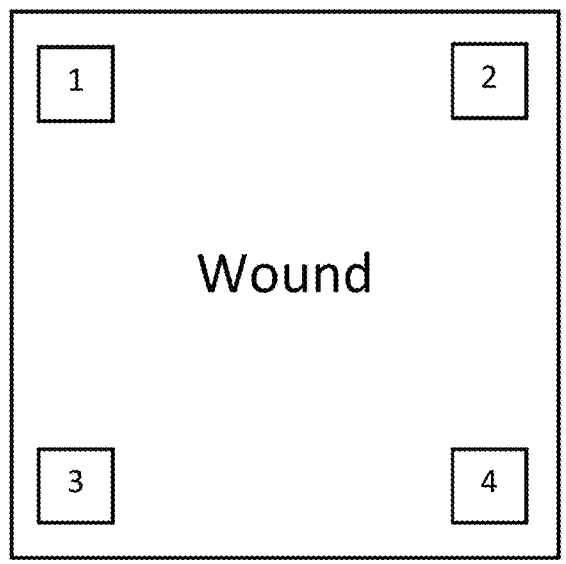
FIG. 9 is an illustration of image markers in the corners of the wound.

Instead of patterning the whole wound, one can use multiple large markers, e.g., four image markers in the corners of the wound, which the HOLOLENS then can use to track the wound (see FIG. 9). The main challenge with this method is that the markers would have to be relatively decent in size to work; and thus, may be impractical for developing a smaller (e.g., gunshot) wound. This approach may also be less desirable than the pattern or border approach (FIG. 8) since there theoretically could be angles in which no markers are fully visible; meaning the HOLOLENS can lose complete tracking of the wound. It appears that the main approach would be to use multiple markers, e.g., 2 markers bordering the wound to the sides, 3 markers arranged in a triangle, 4 markers arranged in a rectangular or 4 markers arranged in a circular fashion around the wound in the center. All markers need to be big enough such that they can be detected by the HOLOLENS. However, there is a trade-off in increasing the number of markers around the wound considering the computational cost of tracking multiple markers, e.g., with the limited computational power of the HOLOLENS, and the space requirements.

Model Based Approaches

Traditionally, trying to retrieve the full 6 Degrees of Freedom (DOF) pose of a 3D model at a high framerate is quite challenging since objects can be ambiguous in their pose and can undergo occlusions as well as appearance changes, and the corresponding computer vision approaches tend to be computationally expensive. 3D object tracking from color image streams can be roughly divided into sparse methods that try to track local correspondences between frames, and region-based methods that exploit more holistic information about the object such as shape, contour or color. Both directions have pros and cons, e.g., the former performs better for textured objects whereas the latter performs better for texture-less objects. With the advent of commodity RGB-D sensors such as those in the HOLOLENS or KINECT, these methods have been further extended to depth images, which is beneficial since image-based contour information and depth maps are complementary cues, one being focused on object borders, the other on object-internal regions. While any solution using such model-based tracking in the scope of this project is heavily dependent on the chosen implementation of a computationally lightweight computer vision algorithm or use of an optimized (and usually limited) library, several options exist in this direction.

For instance, an embodiment of the invention includes creating a rigid-body bracelet which would go around the arm of a simulated casualty. The bracelet provides features in the depth and color/infrared streams of the HOLOLENS such that the bracelet and arm could be tracked from an arbitrary angle, i.e., it could be rotated or moved freely. The idea is that the wound would cover a certain region of the arm and the bracelet is covering a part of the periphery. The use of either one large or multiple (geometrically different) smaller bracelets are options. In the maximal case, these could be wrapped around the upper arm, lower arm, wrist, etc. Some model-based tracking approaches are implemented in VUFORIA, VISIONLIB, and OPENCV, which are sufficient to track such a rigid body. The bracelet could also be patterned so that it could employ both model-based tracking and image-based tracking. This approach does not seem desirable for wound tracking on predominantly flat areas of the body, e.g., for a wound on the chest, where a 2D image-based marker tracking approach would be optimal. In such areas, adding a 3D model-based marker might improve tracking performance when the camera/HOLOLENS is looking at the wound from a steep angle, but the marker would be very noticeable. Using a model-based approach to track the wound itself does not seem that useful, since one of the main desired features is that the wound could deform, which would mean the loss of tracking.

Testing demonstrated that the VISIONLIB API supports tracking a model that can take on different "states" of a semi-rigid object (e.g., bracelet or wound), when it deforms into certain shapes. We investigated model-based APIs and algorithms published at the leading conferences (ISMAR, CVPR, etc.) with regards to RGB-D model tracking.

Hybrid Approaches

Apart from full 6 DOF image and model-based tracking approaches, using a hybrid 3 DOF position and 3 DOF orientation tracking approach has value. Instrumented moulage may include a low-cost Inertial Measurement Unit (IMU) to measure its orientation in space, which would optimally be based on 9 DOF sensors with 3-axis accelerometers, gyroscopes, and magnetometers to compensate for drift. If the orientation does not have to be tracked using image or model-based computer vision approaches, this makes tracking the position using computer vision and RGB or RGB-D data easier.

One method includes an infrared LED mounted on a tracked object. The LED is visible in the infrared camera of a MICROSOFT KINECT, which (after calibration) is then used to cast a ray into the scene along which the LED must be located (see FIG. 10). The depth information from the KINECT could then be used to compute the distance of the LED from the KINECT. Combining the information from the 2D position of the LED in the infrared camera and the depth of the LED in the depth image then allowed its position to be tracked at the accuracy of the KINECT sensor, which (although not optimal) proved higher than skeleton-based tracking approaches.

Whenever the AR HMD sees the wound, optimally, it would update its position. In parallel, the IMU embedded in the wound could always update its orientation. To compensate for an inherent drift in IMU data, e.g., when close to metal objects interfering with the magnetometers, one could use the orientation data from occasionally tracked image markers and re-calibrate the IMU's orientation. One benefit of this approach is that it could be used in parallel to image and model-based tracking, e.g., as a fallback solution, with very low computational cost.

Figure 10:
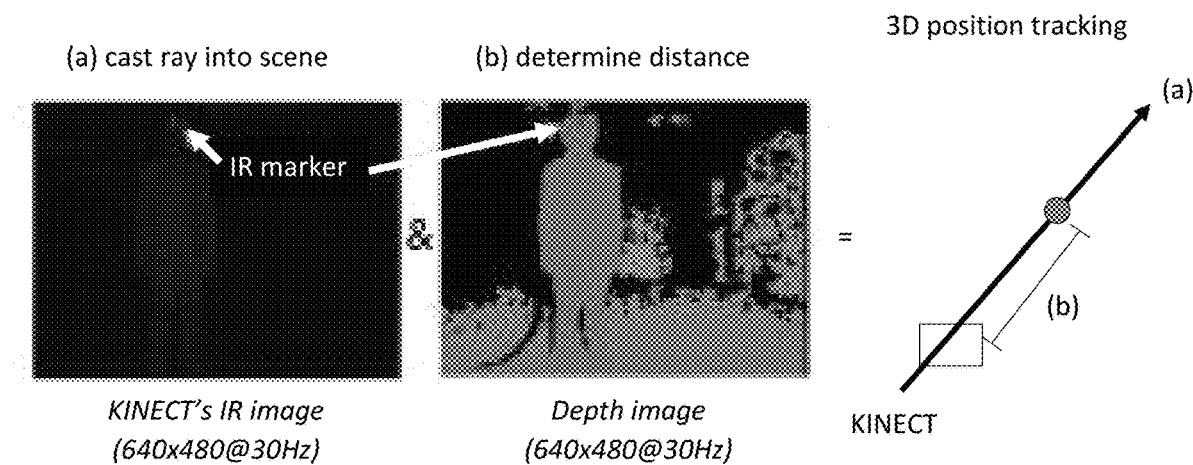
FIG. 10 are illustrations of background development focused on position tracking with infrared and depth information, which could be adapted for hybrid position-orientation tracking with an AR HMD.

FIG. 10 is an illustration of work focused on position tracking with infrared and depth information, which is adaptable for hybrid position-orientation tracking with an AR HMD.

Prototype Development

Marker Tracking

ARToolKit Implementation

Based on initial tests, we looked into the ARToolKit API for marker tracking on the HOLOLENS. ARToolKit is an open-source computer tracking library for creation of strong augmented reality applications that overlay virtual imagery on the real world. It is currently maintained as an open-source project.

The HOLOLENS version of ARToolKit proved to be more challenging to work with than the common version for desktop computers and webcams: tracking frame rates would constantly stagger to under 1 frame per second, it failed to superimpose a hologram on top of a marker accurately out of the box, and some extensive testing was required to deduce the best configuration of ARToolKit.

It appeared that the HOLOLENS was not giving enough computational power to the tracking routine. Configuring ARToolKit to run without any debug symbols and using a lower resolution configuration file for ARToolKit's ARUWPControlller improved frame rates yet was nowhere near the author's 25 to 30 frames per second performance. After extensive debugging and code tracing, we traced back the issue to the ARUWPVideo class within the ARToolKit scripts. The ARUWPVideo class offers the ability to display a "preview" screen of the HOLOLENS' webcam footage in a user's HOLOLENS environment. This preview is supposed to reduce frame rates, however, it appeared that the exact opposite was happening: within a preview window, frame rates would stagger to what we were experiencing. Casting the preview window media to an empty GameObject within UNITY would bring performance up to the expected benchmarks.

This might be occurring due to the architecture of the implementation of ARToolKit for the HOLOLENS. When a video preview window is being displayed, webcam footage is being polled so that the preview window appears to be real time. This does not seem to occur without a preview window, and a lack of constant polling on the webcam API seems to stagger the marker tracking routine. The webcam pipeline and the marker tracking routine are intertwined considerably: if the webcam is constantly being polled for updated footage, it forces the marker tracking routine to be on-par with the real time footage.

We thus cased the webcam preview to an empty GameObject (a container in the UNITY Engine), which provided a fix to this issue. The second issue had to do with the fact that the geometry of the webcam footage does not have an exact correspondence to the geometry of a HOLOLENS environment. This geometrical correspondence needed to be adjusted by creating a custom web cam calibration file for ARToolKit and by adjusting ARToolKit's undistortion function.

We created a custom calibration file using Long Qian's OPENCV-to-ARToolKit calibration program. Using several photos of a black and white checkerboard taken at varying angles using the HOLOLENS, these files were fed into an OPENCV calibration file creator, and then fed into Long Qian's convertor. We created a calibration file at the 1344×756 resolution, which provides a wider tracking field of view than the default 896×504 resolution at a ~10 frames per second performance cost. Using this calibration file in conjunction with tuning values in the undistortion functions produced a hologram that appears quite accurately on top of the marker.

The third part was adjusting the ARToolKit settings and configuration, e.g., we ended up converting the webcam footage into mono and fed that into ARToolKit instead of using plain colored webcam footage.

Figure 11:
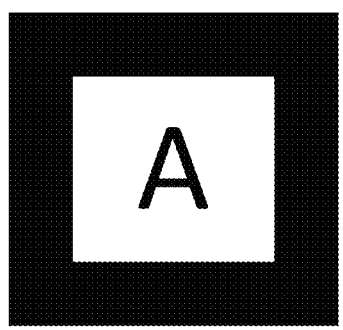
FIG. 11 shows ARToolKit markers and inventors' prototype implementation on the HOLOLENS.
Figure 11:
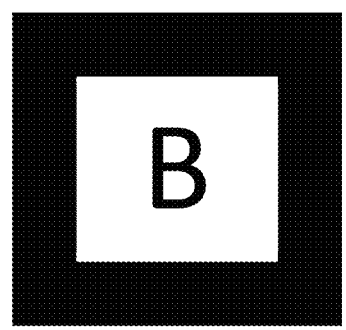
Figure 11:
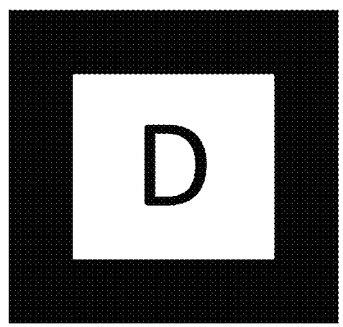
Figure 11:
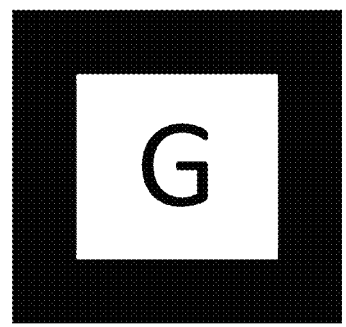

FIG. 11 shows an example multimarker setup based on ARtooolKit markers and inventors' prototype implementation on the HOLOLENS. With ARToolKit, inventors developed code that positions a hologram between multiple markers, referred to as "Multi-Marker Holograms," and likewise their markers as "Multi-Markers." Depending on what markers are visible, the code finds what set of markers can be used to determine a position for the multi-marker hologram and, if such markers exist, use their positions to place the multi-marker hologram in the HOLOLENS environment.

In a basic four-marker case, inventors considered a flat square surface with markers in the corners (see FIG. 11). Seeing multiple markers improves the performance of tracking the correct pose and positioning the hologram relative to the marker(s). In particular, if diagonal markers are visible, the orientation accuracy appears to be considerably higher. The IMU would be used to adjust the hologram in cases of orientation changes.

Visible Markers and ARToolKit

We made improvements to the ARToolKit implementation for the HOLOLENS, the most notable of which being improvements to the visual calibration. We fine-tuned the undistortion function so that holograms appear along the line-of-sight of a physical marker. We also made modifications to the ARToolKit's marker detection parameters to increase the probability of a marker being identified, and to decrease the probability of a camera region being falsely identified as a marker. For instance, we lowered the corresponding confidence threshold to 0.4 and used matrix marker types.

We also worked on our multi-marker detection system. Here, the hologram is placed relative to the position of two or more markers. The corresponding code track the markers in parallel and places a hologram using the position of the most reliable marker as indicated by ARToolKit, while keeping a list of all visible makers so that if one marker goes invisible, the system can place the hologram relative to the other markers. Some aspects of this system are incorporated into our single marker system. For instance, to help prevent detection of false markers, all markers know how far apart they should be from each other. This helps markers from being falsely detected when an area in the HOLOLENS' surroundings is falsely identified as being a marker. Of course, this failsafe only works in the case that other markers are currently visible.

New Version of ARToolKit

A new version of ARToolKit was released by its developer, Long Qian of John Hopkins University. This new version of ARToolKit was supposed to provide a steady 30 fps tracking performance at 1344×756 pixels resolution, which is a considerable improvement over the last version of ARToolKit, which provided ~25 fps at 844×504. This new version of ARToolKit also supports the IL2CPP backend, which means that our software can support the latest versions of UNITY. We worked on the integration of this newest version of ARToolKit into our software.

Marker Loss Compensation

In VUFORIA Engine Release v7.5.20, a larger update was made, which improved model and image tracking for smaller targets. We tested this recent release to see if it would work for our purposes, as VUFORIA is a more mature library than ARToolKit. However, ARToolKit still seemed to be superior in its tracking ability for more simple markers. Hence, we decided to not pursue replacing ARToolKit with the latest release of VUFORIA.

Inventors made several smaller improvements. For instance, we discussed the integration of the MIXEDREALITY TOOLKIT. Due to compiling issues this was temporarily removed. However, we could reintegrate it. We improved upon our "debug dialogs" to include more details for developers. We also implemented a Bluetooth "heartbeat," so that the HOLOLENS software can possess confidence that the smart wound hardware is on and in reach of sending/receiving data at all times.

Figure 12:
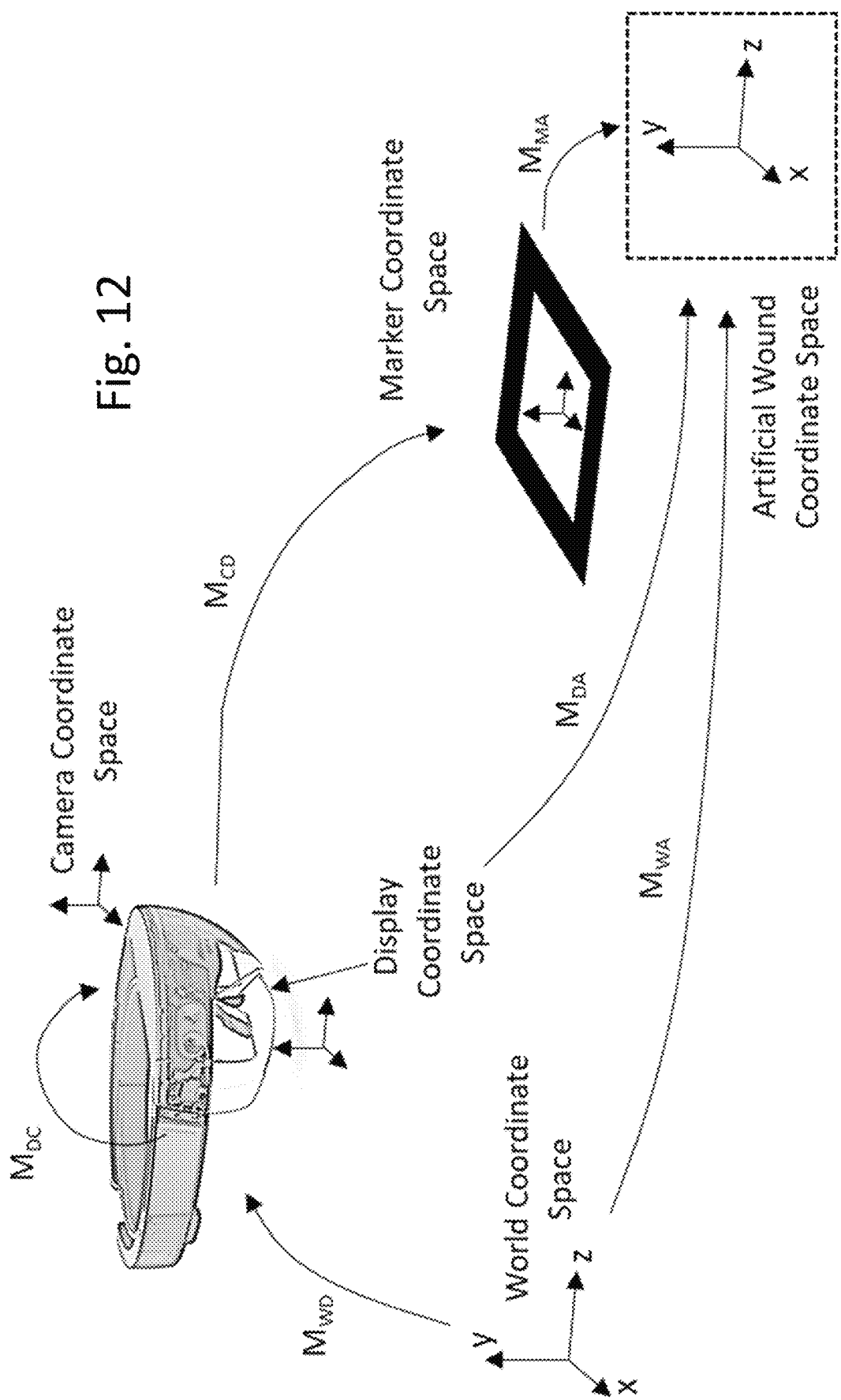
FIG. 12 shows illustrations of two rendering/transformation pathways that deal with either tracking loss in the HOLOLENS' camera or in the HOLOLENS'-based self-tracking.

FIG. 12 shows illustrations of two rendering/transformation pathways that deal with either tracking loss in the HOLOLENS' camera or in the HOLOLENS' SLAM-based self-tracking (Simultaneous Localization and Mapping). $M_{MA}$ is the (static) transform from marker relative to the artificial wound. $M_{CD}$ is (dynamically) determined by ARToolKit when the marker is visible in the camera image. $M_{DC}$ (static) is the extrinsic calibration performed through Microsoft's HoloLens application programming interface (API). $M_{WD}$ (dynamic) is the transform from World Anchor in Microsoft's Spatial Map. The rendering and transformation pathways include: (1) relative to world anchor ($M_{WA}=M_{MA} M_{CD} M_{DC} M_{WD}$), persistent even when marker tracking is lost; and (2) relative to display ($M_{DA}=M_{MA} M_{CD} M_{DC}$), persistent eve when world tracking is lost.

Multi-Marker Hologram Placement

Figure 13:
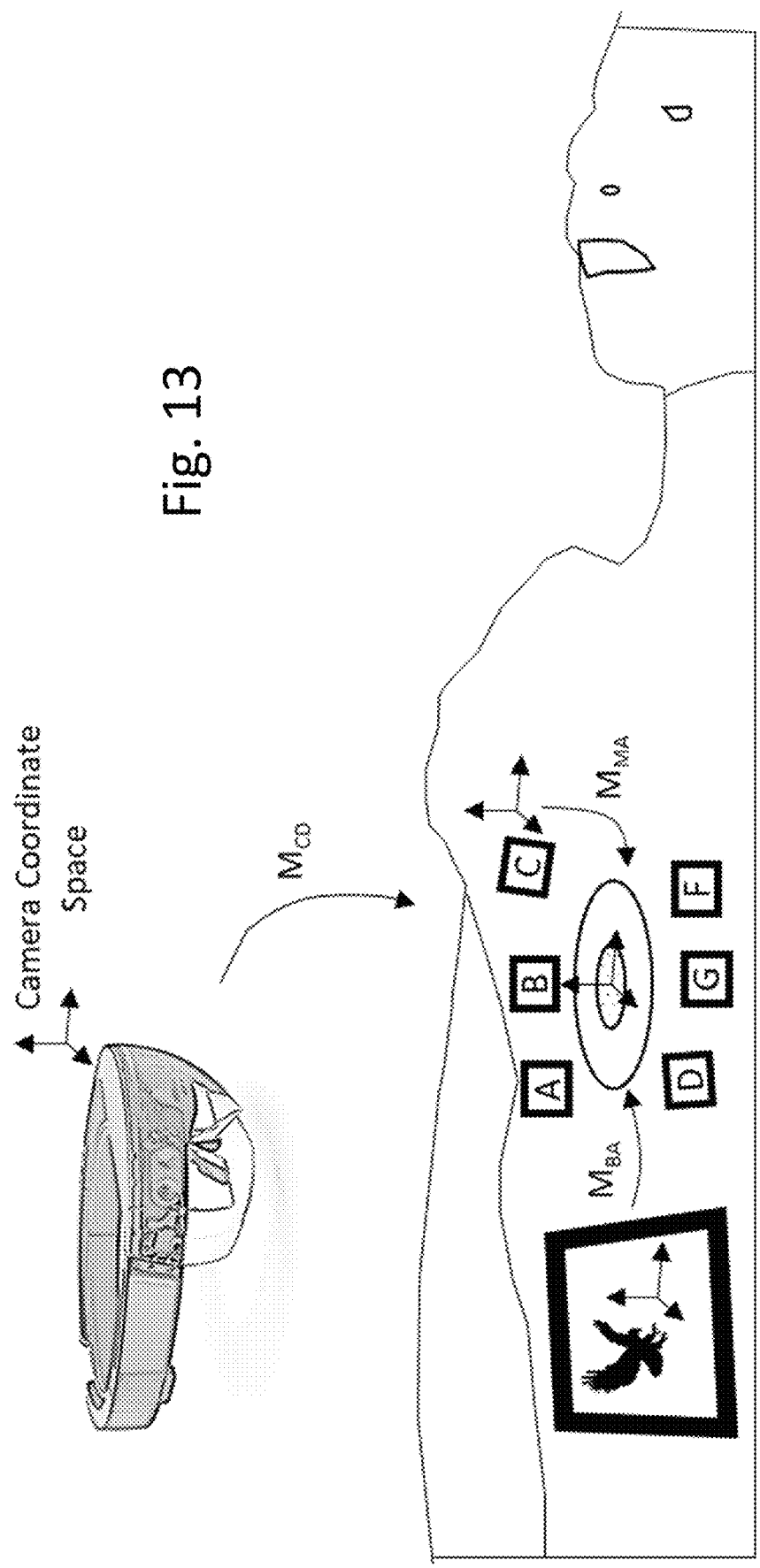
FIG. 13 an example of multi-marker tracking using an embodiment of the invention.

An issue in the development was how we can properly superimpose a hologram in the correct position over a moulage when the placement of markers can vary. To that end, we developed a calibration, which requires a user to get all the markers in the view of the HOLOLENS, and the user then places the hologram on the moulage. The markers then recognize where the hologram is placed relative to themselves and use that information to superimpose the hologram in the correct position as illustrated in FIG. 13. FIG. 13 shows large ARToolKit marker(s) placed on torso to be visible in HoloLens' camera images from a distance; multiple smaller ARToolKit markers placed close to instrumented moulage; and 9-axis Inertial Measurement Unit (IMU) embedded in moulage. This relied on a larger marker for initial tracking, however, it uses smaller markers when possible and advantageous.

This is easy to implement, as at its core it simply has each marker store the location of the hologram relative to itself, which can be extended in the future. Our system is based on older features of our multi-marker system, such as using a distance interval to prevent false positives in the camera-based marker detection from being considered.

Visual Tracking Improvements

We tested and improved the visual tracking approaches. To compare the performance, we ran marker tracking tests with ARToolKit and, in comparison, ARToolKit performed better than VUFORIA in all of our test runs. ARToolKit was able to track markers as small as 1" at meaningful distances (within a one-meter spherical radius), and while ARToolKit does show visual tracking drift when a user's head moves quickly, VUFORIA also showed the same effect. While neither library is perfect, ARToolKit appears to be the library of choice for our application.

We investigated how well ARToolKit performs with marker tracking at "far" distances, meaning more than one meter away from the marker, and if there were any adjustments which could be made to the ARToolKit configuration to improve tracking at these distances. One of the initial approaches we followed to improve tracking at such distances was to run ARToolKit's image analysis algorithms on a higher resolution webcam video stream. The HOLOLENS provides three webcam resolutions: 896×504, 1280×720, and 1344×756. The first resolution is the resolution we have been using since our implementation of ARToolKit as it performs the fastest. The 1280×720 resolution, while providing better image quality, offers little in comparison to the 1344×756 resolution, as the latter has a wider field of view (67 degrees versus 45 degrees), and the algorithms seemed to run on the latter without a notable performance change from the former.

Our original hypothesis was that increasing the resolution from 896×504 to 1344×756 would improve marker tracking at a distance, at the loss of update rate. In our tests, the different resolutions yielded no noticeable change in the distance at which ARToolKit could track markers, while resulting in a clearly reduced update rate. The only notable advantage of the 1344×756 resolution over the 896×504 resolution is an increased field of view. Typical performance with the 896×504 resolution yielded around 25-30 fps, while the 1344×756 resolution yielded between 21-27 fps.

ARToolKit Optimization

Inventors optimized the ARToolKit based marker tracking implementation for the HOLOLENS. As previously discussed, from the tested marker tracking libraries, ARToolKit is the one library that is able to track markers that are farthest away from the camera due to the very simple layout of these markers compared to VUFORIA and other libraries. However, it had multiple issues, mainly related to the low frame rate that could be reached on the HOLOLENS with the native implementation of the ARToolKit for the HOLOLENS that is not optimized for the HOLOLENS and does not take into account the peculiarities of this highly optimized hardware and software platform.

Earlier, inventors realized a challenge related to how the HOLOLENS' video streaming implementation for the ARToolKit (specifically the ARUWPVideo class) affects performance. Namely, we observed that when there is no video preview window for ARUWPVideo to cast to, performance degrades severely. This problem was temporarily overcome by casting ARUWPVideo's preview to an empty game object containing a mesh. To overcome this limitation in a more efficient manner, we relocated the code responsible for what ARUWPVideo does in terms of the preview window into the marker tracking routines within the ARToolKit for the HOLOLENS implementation, which removes the need to create a fake video preview window.

The implementation of the ARToolKit library captured web cam footage at the 1344×756 resolution. The HOLOLENS only supports three resolutions for webcam footage capture: 1344×756, 1280×720, and 896×504. After testing, we observed that frame rates were too low with the 1344×756 resolution, and the developer of the ARToolKit library advised against the 1280×720 resolution. Thus, it was decided to use the lowest resolution of 896×504. This increased frame rates to around 25 fps on average. This change in resolution forced us to update the calibration of the camera stream. We created a custom calibration file using OPENCV's main calibration method, which entails taking multiple pictures of a checkerboard pattern using the HOLOLENS' camera.

The author of the ARToolKit library, Long Qian of John Hopkins University, provides a program which turns OPENCV calibration files into ARToolKit calibration files, so we then utilized that program to create our calibration files. We then fine-tuned the calibration (magicMatrix and the undistortion function) to help ease out other calibration issues. This resolution change also implicitly induces a change in the field of view in which we can track markers. Our previous resolution of 1344×756 produced a horizontal field of view of 67 degrees, while our current resolution of 896×504 produces a decreased horizontal field of view of 48 degrees.

We also had to make several general improvements to the ARToolKit code. For instance, marker tracking no longer relies on a queue of backlogged transformations, rather, holograms for marker tracking are always updated to be the latest transformation of the marker. This helps holograms to not lag behind the markers when the markers are moved.

In addition, inventors also addressed the orientation-variant marker hologram placement. A single marker is sufficient to place a hologram with 6 DOF, but multiple marker setups provide redundancy to strengthen the tracking accuracy and prevent tracking loss, e.g., a 2×2 square marker setup with four different ARToolKit marker types usually means that at least one or two of the markers is identified in the HOLOLENS' camera image stream.

IMU and Bluetooth

We integrated an MPU6050 inertial measurement unit (IMU) to compensate for marker tracking loss. MPU6050 devices from InvenSense, a TDK Group Company headquartered in San Jose, Calif., combine a 3-axis gyroscope and a 3-axis accelerometer on the same silicon die, together with an onboard digital motion processor, which processes complex 6-axis algorithms. In our prototype, this IMU was integrated onto a protoboard with an ARDUINO Micro and an HC-06 Bluetooth chip.

In order to get IMU data to the HOLOLENS, we utilized a basic Bluetooth HOLOLENS API created in-house at the University of Central Florida, which was extended, e.g., to clear the Bluetooth message queue in the case that a performance hitch occurs and the incoming data exceeds the buffer. We spent some time optimizing the message packet size and reducing processing overhead. An ARDUINO Micro was programmed with firmware that packages a Bluetooth message, and that firmware is used to send data being received from code that is processing the IMU data. Translating the IMU data to UNITY rotations was straightforward. The IMU sends data in yaw-roll-pitch format, which we replaced with quaternions to avoid Gimbal Lock related issues.

IMU Calibration

We calibrated the IMU to the HOLOLENS using a two-step process. First, we performed an intrinsic calibration of the IMU to rule out relative magnetic interference effects. Second, we designed an extrinsic calibration process based on an optical marker to align the orientation of the IMU (gravity and magnetic north) and the HOLOLENS' (gravity-aligned) coordinate systems. This process then can also be used repeatedly at run time during use to interpret IMU data based off the last orientation of the IMU before optical image tracking is lost.

We decided to use Quaternions instead of yaw-pitch-roll angles to avoid Gimbal Lock issues. We hence changed the ARDUINO firmware that we used in our prototype to send out data in Quaternion format. However, since this increases the data traffic from 3 to 4 values for orientations, we reconsidered this choice if we observed issues related to limited bandwidth or latency.

IMU and Network Streaming

Several improvements were made in how the data from the IMU is handled in the AR system and in terms of the Bluetooth real-time streaming code for the 3 DOF orientation tracking data. With regards to the IMU data, we made several changes to how we calibrate the IMU and how we interpret the IMU data. For instance, we implemented a re-calibration method which incorporates rotation of the image markers in addition to the rotation of the IMU when visual tracking is lost. This addresses an issue we were experiencing where the orientation of a multi-marker hologram would jump from one orientation to another because of differences between the orientation of the marker(s) and IMU.

We made performance improvements to our Bluetooth code to reduce the latency of IMU data streamed from the instrumented moulage to the HOLOLENS. Updates were thus sent to the HOLOLENS every 30 ms. Pending formal latency measurements, the results in terms of orientation updates on the HOLOLENS appear more reasonable. We also modified our ARDUINO firmware to support sending a matrix of values from the IMU and VELOSTAT using a unified protocol. VELOSTAT is a brand name of Desco Industries, Inc. for a packaging material made of a polymeric foil (polyolefins) impregnated with carbon black to make it electrically conductive.

Bluetooth Optimization

Inventors optimized the Bluetooth code. An example being that previously, the Bluetooth code handled a lot of processing within the code responsible for receiving Bluetooth signals. This reduced how quickly the HOLOLENS software was able to process Bluetooth signals. To optimize this, we offloaded all post-message receiving code to outside of the Bluetooth receiving code. This helped improve Bluetooth signal receiving speed considerably.

We also have made modifications to both our Bluetooth code and ARToolKit so they work in sync. For instance, when we are relying on image tracking, the Bluetooth routines lay dormant so they do not take up processing power. This specific fix helped reduce graphical stuttering we were experiencing. Another example being the multi-marker code, which was outlined in the previous report, also stops expecting multi-markers and performs no processing relating to such.

Pressure Sensing

The touch and pressure sensitive VELOSTAT surface is designed to have two layers of conductive material (one outputting ground, one outputting a fixed voltage) which sandwich the VELOSTAT. On top of this VELOSTAT "sandwich" a skin-like surface is placed which is made using liquid rubber which represents a moulage which would go over this touch-sensitive surface.

We integrated code to manage pressure sensing values received from the VELOSTAT material. The VELOSTAT needs to be calibrated against a reference value, since voltage values read off the VELOSTAT may be different in different scenarios or environments. To compensate for this, we calibrate VELOSTAT readings when the HOLOLENS software starts. We accomplish this by reading what the VELOSTAT values are when the software starts up, and then determine pressure values based off its relative change. For instance, if the VELOSTAT starts by reading 0.8 and then decreases to 0.2, then there has been a 75% pressure differential. In the case of a bleeding wound this pressure differential can be used to determine if a enough pressure has been applied to stop the bleeding based off of pre-programmed differentials.

To demonstrate the pressure sensing capabilities, we implemented a demo using pressure differentials to reduce the bleeding of an AR wound. In this demo, we defined that once the pressure differential reaches 60% to stop the holographic display of blood, and when the pressure differential is <=60% to simply adjust the amount of bleeding. The closer to 60% the differential is the more the bleeding is reduced.

We also experimented with pressure sensing based on the VELOSTAT material. Physically, this is accomplished by applying isolated regions of conductive thread throughout the VELOSTAT on one side, and then applying conductive thread throughout the whole other side of the VELOSTAT (not necessarily in isolated regions). For the side with isolated regions, we apply a voltage (which is arbitrary, however currently this voltage is applied by the ARDUINO's PULLUP pins) and on the other side we connect it to a ground. VELOSTAT works by increasing the electrical resistance of the material when pressure is applied, so when a user presses on the VELOSTAT, a region of pressure can be detected by measuring the voltage drops in various regions of the VELOSTAT.

Multiple Area Pressure Sensing

In an embodiment of the invention, multiple distinct areas of VELOSTAT may be used to achieve multi-area pressure sensing. One problem that arises with multi-area pressure sensing is the need for orientation information. In order to infer an area of pressure for visualization purposes we need to know the orientation of the VELOSTATS. This problem is solved by utilizing our existing marker-and-IMU approach to tracking.

We can deduce the orientation of the VELOSTATS using the orientations of the markers and, when that fails, the orientation of the IMU. Note that this does require some standardization; for which we assume that when a marker is not rotated at all, we know the default pose of the wound. We use this default orientation to then deduce VELOSTAT locations when we are not in default orientation. For instance, in a 2×2 VELOSTAT setup, if we are rotated 90 degrees clockwise according to the markers, the top-right VELOSTAT becomes the bottom-right, the top-left becomes the top-right, etc. This kind of deduction is not necessary in setups where the VELOSTAT is orientation invariant; however, it is imaginable that some VELOSTAT setups may be orientation variant, which calls for a need for this type of deduction in order to infer the locations of the VELOSTATS, and thus to know if a trainee applied pressure in the right location on or around the wound.

We also had to make changes as to how VELOSTAT values are read in the HOLOLENS software. When the HOLOLENS software was initially created, the Bluetooth connection was only used for the IMU. Hence, the IMU code primarily managed the Bluetooth data. When we started testing with VELOSTAT, we changed the IMU code to handle the pressure values coming along with the IMU data. We relay the VELOSTAT data that comes to the IMU code as a result of the VELOSTAT and IMU data being packeted into one Bluetooth packet. The IMU code takes the IMU data out of the original packet delivered to the code, and then crafts a new packet to be delivered to the pressure sensing manager containing purely the VELOSTAT information. The pressure sensing manager then deals with this data.

A simple system has been implemented where our UNITY application now stores a simple database of wounds, and each wound has specific markers tied to it. When the HOLOLENS sees a marker, it consults this database to attach a certain wound to it. This wound specification is then used to interpret the VELOSTAT pressure sensing data.

Sensitivity

The VELOSTAT is covered with conductive wire then embedded into the silicone. We used tape to secure the conductive wire to the VELOSTAT. We thought that the sensitivity of the VELOSTAT is affected by the shape of the wire, so we explored different patterns. It did not turn out to be the case. Other factors that we would like to explore to find out what could affect the sensitivity are the tape used, the size of the patch, or the brand of VELOSTAT. The VELOSTAT has conductive wire. We used different patterns (spiral, parallel) with different spacing. This seems not to affect the sensitivity. There is one layer of silicone and one layer of VELOSTAT. A layer of silicone (pre-coloring) is shaped like a gunshot wound and covers the VELOSTAT. We used the transparent wound to show the VELOSTAT underneath. The same smart wound can have colors.

Physical Moulage

We have been investigating different methods of making moulage, and we looked to develop sample moulage to integrate the VELOSTAT with. The materials we were planning to use were SMOOTH-ON'S SMOOTH CAST 300 RESIN and SMOOTH-ON'S DRAGON SKIN FX-PRO. The latter of which we used to make very simple moulage previously.

We investigated different moulage designs. We moved forward with using SMOOTH-ON products to develop moulage, and we looked more into that approach, e.g., shaping non-sulfur clay for the moulage cast, using SMOOTH-ON'S LIQUID PLASTIC RESIN to cast the shape of the moulage, and using SMOOTH-ON'S LIQUID RUBBER to finalize the moulage.

In our efforts to develop a more holistic system prototype, we invested some time on the prototyping of sample moulage. The process has three main steps: developing a clay mold for a cast, creating the cast, and creating the moulage from the cast.

The first step requires using non-sulfur clay to model a cast. This involves shaping what the moulage will look like out of clay, and then building clay walls around this shape to contain the liquid resin. Once the model has been developed, mold release is sprayed onto it. For the resin, we used SMOOTH-CAST 300 LIQUID PLASTIC. We combine the two parts of the liquid resin in a 50/50 mixture, stir, and then pour the liquid plastic onto the clay mold until it fills up to the top of our clay walls. After allowing the liquid resin to set for 10 minutes, we then remove the hardened resin from the clay. We then proceed to developing the actual moulage. For the moulage, we used SMOOTH-ON DRAGON SKIN FX PRO LIQUID RUBBER. We combine the two parts of the liquid rubber in a 50/50 mixture and stir. If one wished to tint the color of the moulage in a uniform color to give a more skin-like appearance, it should be done before stirring. After stirring for 90 seconds, we then pour the mixture into the cast and let set for 15 to 30 minutes. After the liquid rubber has set, the moulage is removed from the cast. Any imperfections in the moulage can be cut or sanded away.

This way of developing moulage is rather straightforward, and while we did not spend a lot of time attempting to develop more realistic looking moulage as such is not in our focus as of now, this process can be enhanced to develop more realistic moulage.

We prototyped a basic moulage. After developing the moulage, we cut and shaped a piece of VELOSTAT into the shape of our moulage and laid conductive thread on both sides of thereof. We then attached our MPU6050 IMU to the side of the moulage using an epoxy. We then connect this IMU-Moulage assembly to a control board consisting of an HC-06 Bluetooth chip and an ARDUINO. We utilized this prototype to test and debug our system.

We looked into an improved placement of the IMU module as the pressure applied to the moulage can move the IMU, causing false orientation changes. Another area for improvement was the hardware footprint. A custom board using a small Bluetooth SoC in conjunction with a smaller IMU could reduce the footprint to the point where we could embed the board in the moulage. The alternative would be to run thin wires from a larger separate control board to the moulage.

Improved Moulage

We developed a moulage where we could integrate the IMU into the moulage as opposed to attaching the IMU to the moulage. This provides improved orientation accuracy and precision, while also demonstrating how a miniaturized control board with the hardware components could be embedded into the moulage. We also experimented with various initial methods as to how to embed the VELOSTAT and ARToolKit markers into the moulage.

Moulage Molds and Material Exploration

Figure 19:
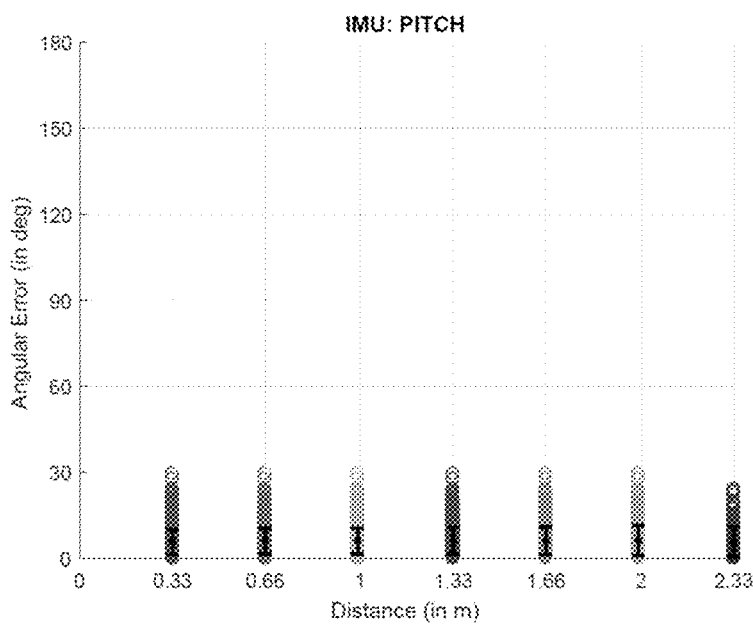
Figure 20:
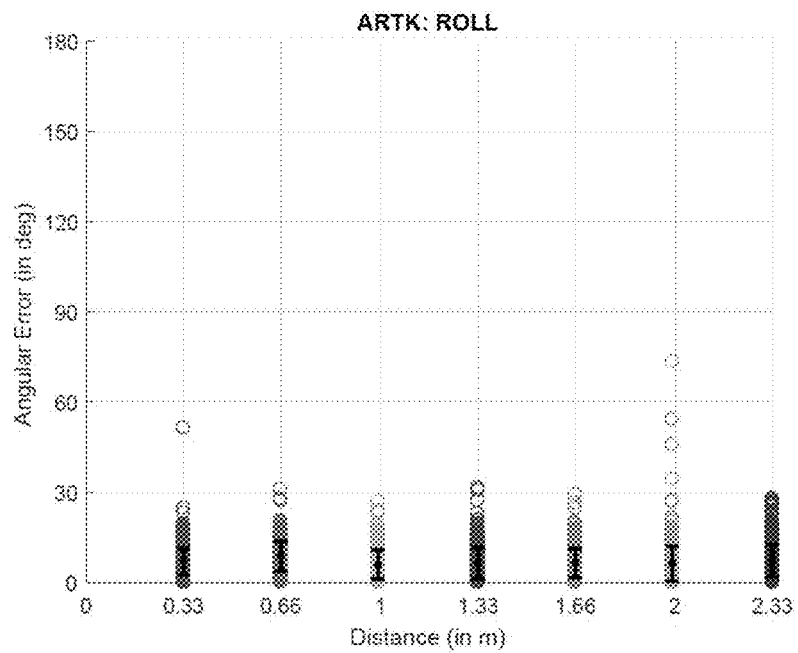
FIGS. 20 and 21 compare results for the ARToolKit ("ARTK") versus the IMU for roll.
Figure 21:
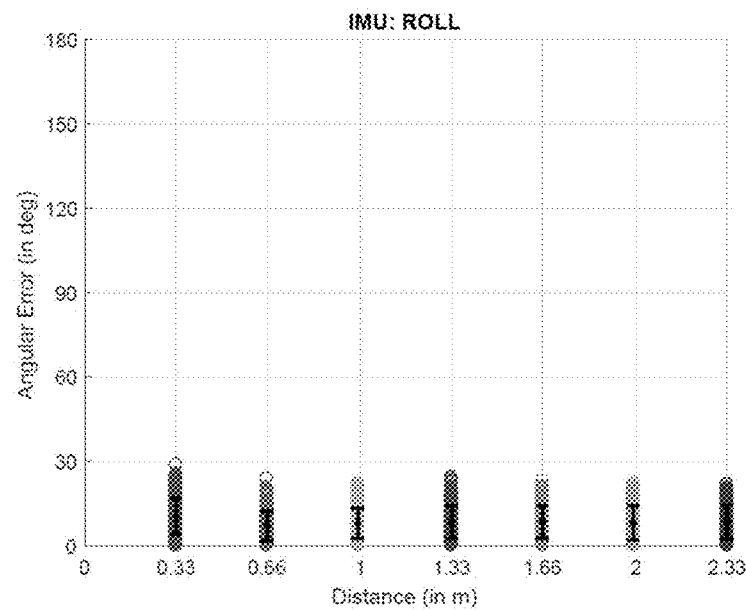
Figure 22:
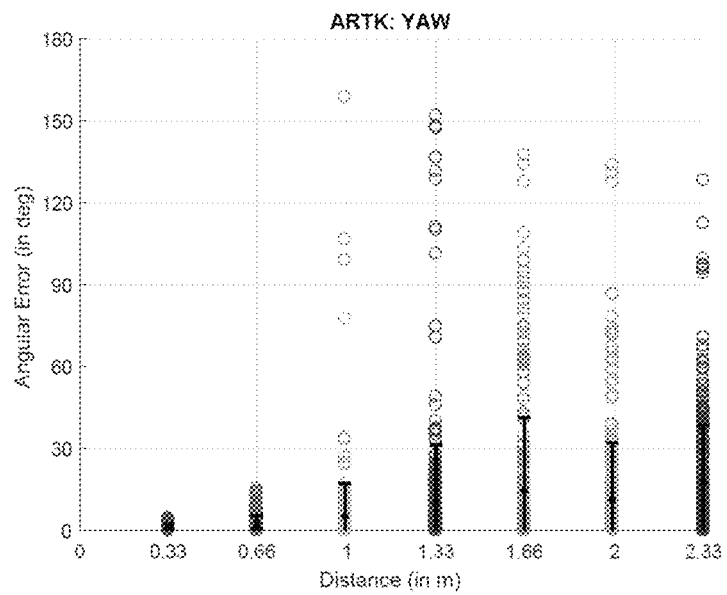
FIGS. 22 and 23 compare results for the ARToolKit ("ARTK") versus the IMU for yaw.
Figure 23:
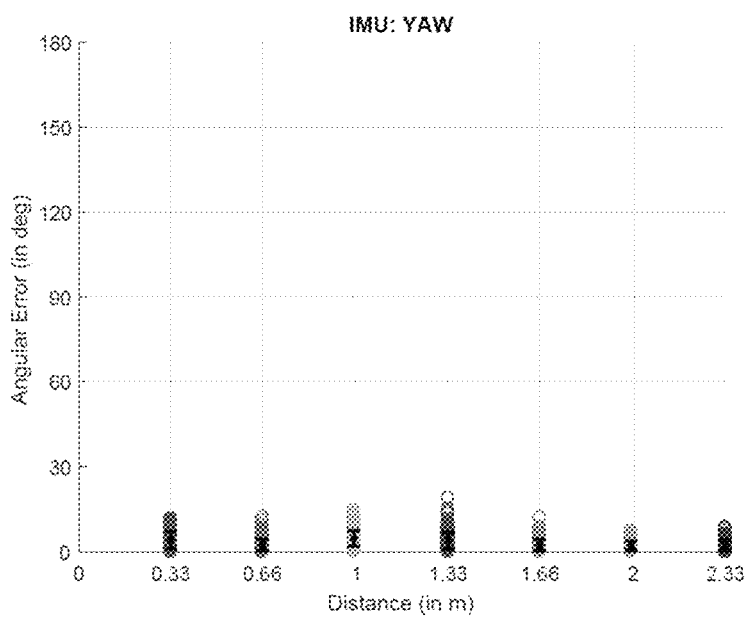
Figure 24:
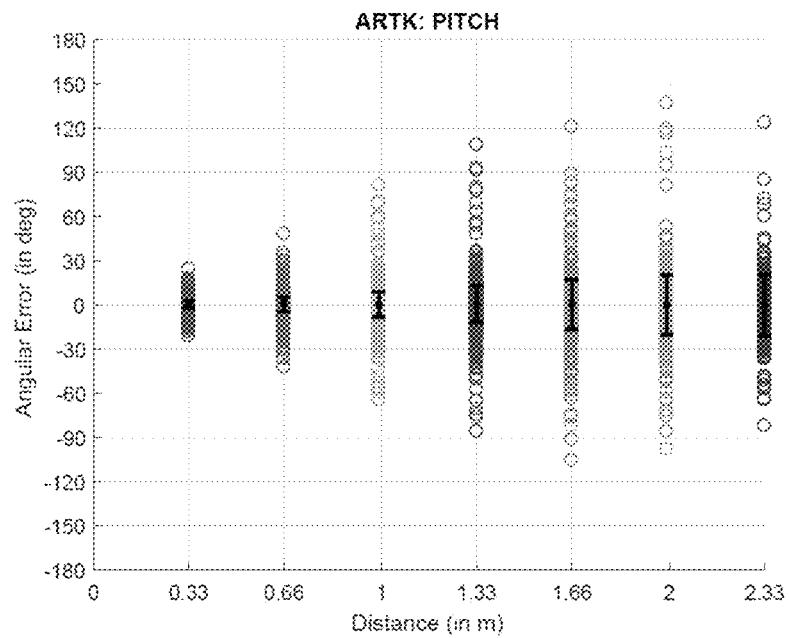
FIGS. 24 and 25 compare angular errors between the ARToolKit ("ARTK") versus the IMU for signed pitch in the range from −180 to +180 degrees from the actual orientation (measured by OPTITRACK).
Figure 25:
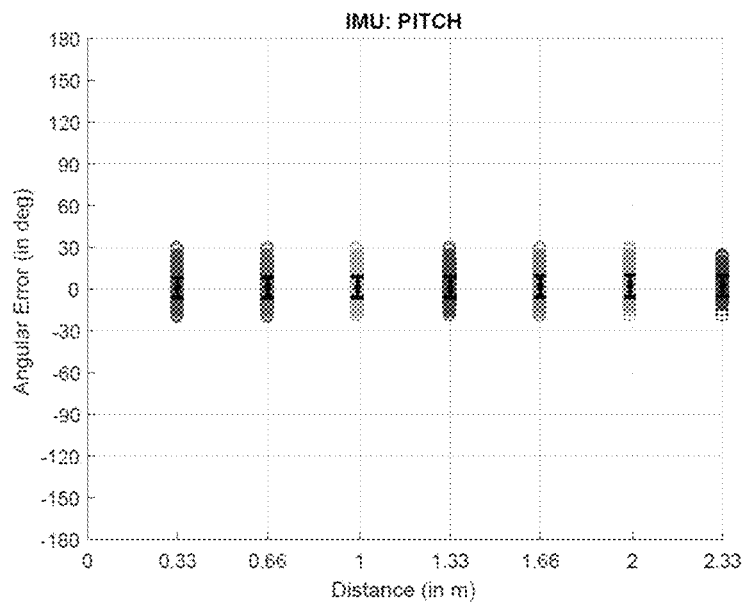
Figure 26:
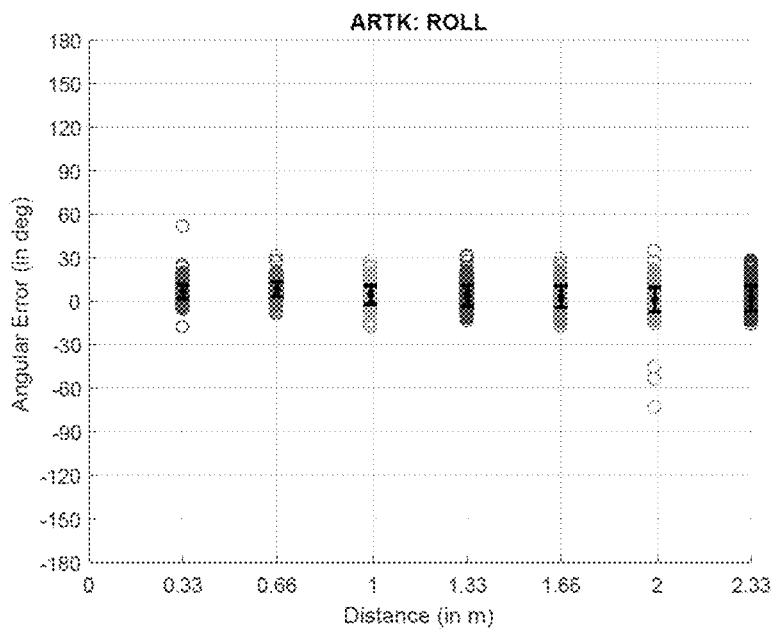
FIGS. 26 and 27 compare angular errors between the ARToolKit ("ARTK") versus the IMU for roll in the range from −180 to +180 degrees from the actual orientation (measured by OPTITRACK).
Figure 27:
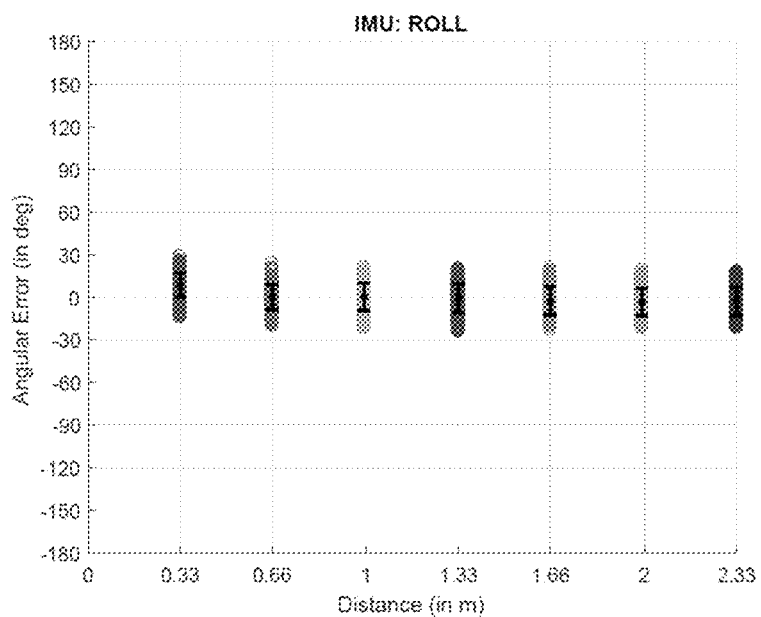
Figure 28:
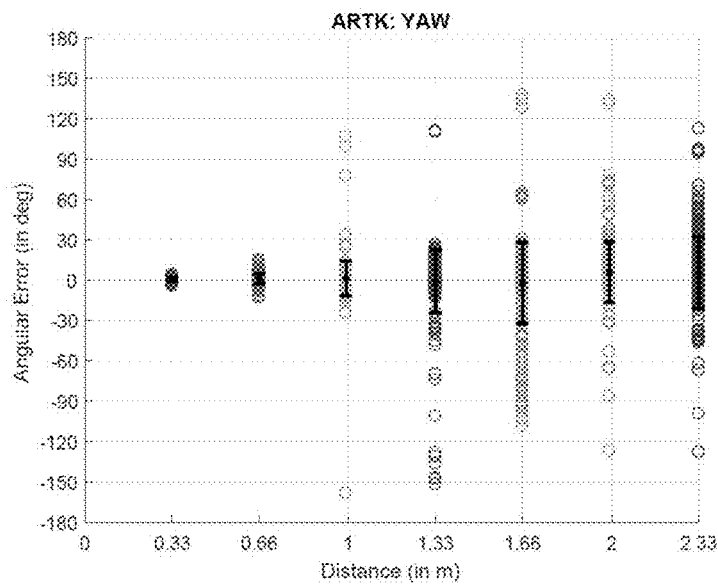
FIGS. 28 and 29 compare angular errors between the ARToolKit ("ARTK") versus the IMU for yaw in the range from −180 to +180 degrees from the actual orientation (measured by OPTITRACK).
Figure 29:
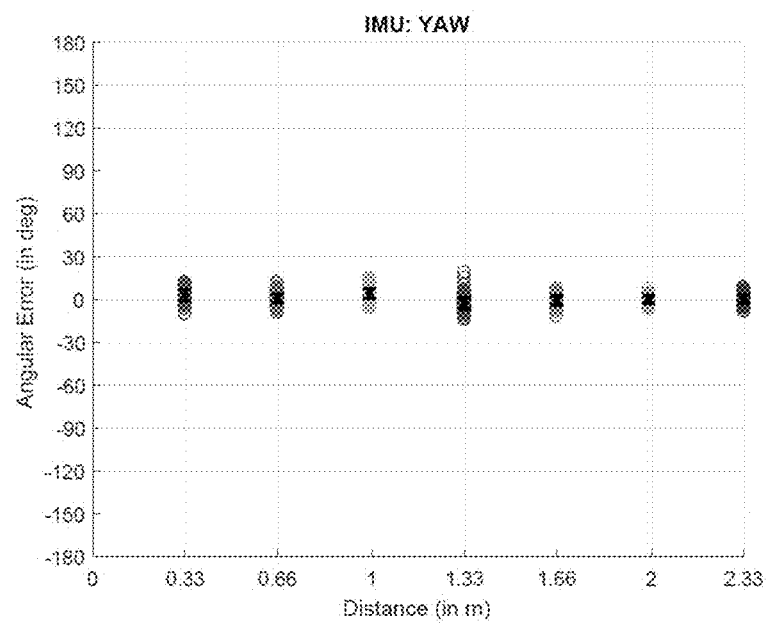
Figure 30:
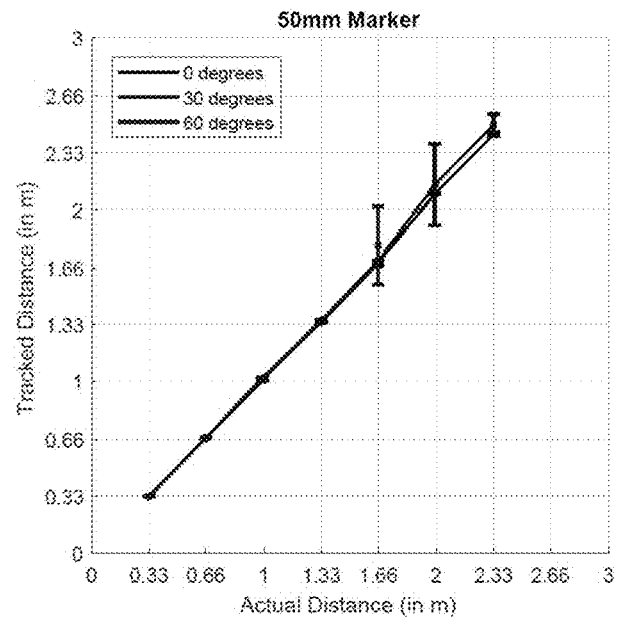
FIG. 30 is a plot showing results of marker size evaluation for a 50 mm marker. The x-axes show the actual distances of the markers, while the y-axes show the tracked distances.
Figure 31:
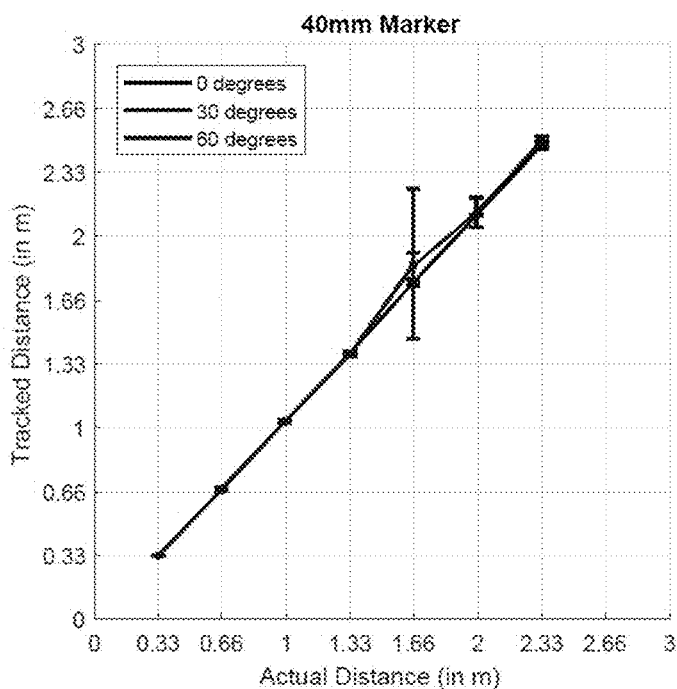
FIG. 31 is a plot showing results of marker size evaluation for a 40 mm marker. The x-axes show the actual distances of the markers, while the y-axes show the tracked distances.
Figure 32:
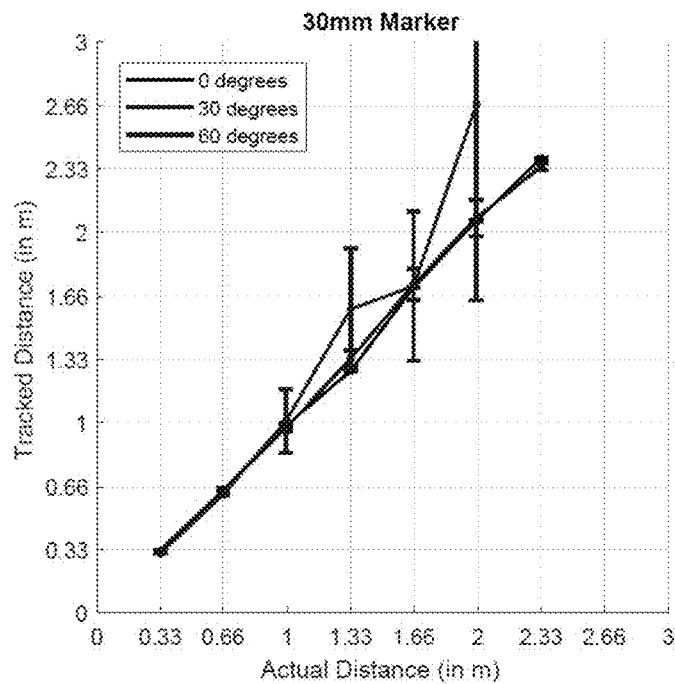
FIG. 32 is a plot showing results of marker size evaluation for a 30 mm marker. The x-axes show the actual distances of the markers, while the y-axes show the tracked distances.
Figure 33:
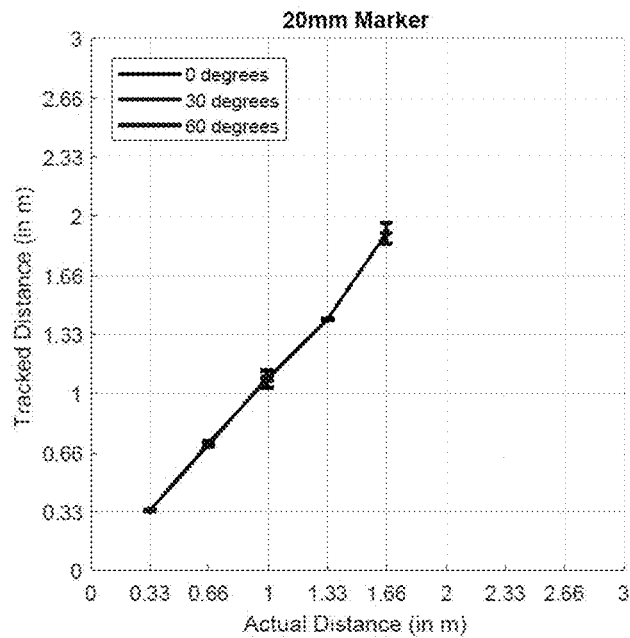
FIG. 33 is a plot showing results of marker size evaluation for a 20 mm marker. The x-axes show the actual distances of the markers, while the y-axes show the tracked distances.

We explored different mold material and wound shapes. We created rubber and resin molds for a cut wound (see FIG. 19) and a gunshot wound (see FIG. 21) and used these molds to create moulage using simulated skin from these molds. The moulage in the photos below show the shape of the wounds before they are colored (see FIGS. 20 and 22). We used a cut wound as a prototype for the smart-moulage during development.

We created clay and rubber molds for different shapes of wounds. We set up the environment to pour the silicone in. The silicone is degassed in a vacuum chamber then poured into the mold. After the silicone cured, we painted the top layer with silicone-based paint to make it look like a real wound.

Digital Moulage

We created 3D models for the wounds in AUTODESK MAYA and imported them into UNITY. In UNITY we can change the shape of the wound and the intensity of blood flow. We connected the change of the wound shape to an XBox controller and connected the blood flow to the smart moulage.

Blood Fluid

We tested and worked on integrating the OBI FLUID UNITY package as a realistic, fluid simulation-based display of blood. However, we found that OBI FLUID does not currently work with the Universal Windows Platform (UWP), the platform running on the HOLOLENS. We examined alternatives such as particle-based solutions like the FXVILLE BLOOD PACK.

System Prototype Integration

We enhanced our previous prototype in two main ways: We created a bigger moulage so that markers could be placed on the actual moulage itself, and we integrated the IMU as a part of the actual moulage rather than attaching it on the side of the moulage.

We also refined the reliability of our marker tracking. We adjusted our prototype to using matrix markers, which when used with the "Mono & Matrix" detection method within ARToolKit provides more reliable marker detection, and also helps prevent fallacious marker detection. We also fixed a visualization bug which made holograms appear at the wrong depth.

We continued working on the hardware to accommodate embedding the electronics into the mold, worked on improving the appearance of the 3D arterial blood, and experimented with venous blood. We changed the parameters of the blood appearance, flow, angle, and color. We also experimented with increasing the VELOSTAT pressure sensitivity by adding an insulating layer between the VELOSTAT and the conductive wire. We further cleaned up the wires for the IMU, and swapped IMUs to better accommodate the moulage demonstration and the IMU evaluation. The original IMU has a longer wire, the headers are soldered flat and are connected to the VELOSTAT. The performance evaluation setup has a shorter wire with headers on a 90-degrees angle. We also tested sending a tactile pulse signal through the moulage by sending an audio file to the TECHTILE TOOLKIT acoustic-haptic device.

Demonstration and Calibration Application

For the sake of demonstration and for debugging and testing, we developed a more sophisticated demonstration application. We wanted to, for instance, be able to test IMU tracking on-the-fly; something which previously was tedious as it required having to remove the marker tracking components from the application. Instead of having to do this any time we wanted to test a specific component of the prototype system, we developed an application that allows us to select separate scenes for testing the system. We focused on five different testing scenes: the IMU scene, the ARToolKit/tracking scene, the VELOSTAT scene, the "fusion" scene, and the "demo" scene.

The IMU scene displays a hologram of coordinate axes with the IMU data in the lower left corner and rotates the coordinate axes in accordance with the IMU data. The ARToolKit/tracking scene projects holograms of coordinate axes onto set ARToolKit matrix markers. The VELOSTAT scene demonstrates a simple VELOSTAT auto-calibration technique and displays the pressure values being read from the hardware. The "fusion" scene showcases the combined IMU-and-ARToolKit tracking, and the "demo" scene showcases all the technologies working in conjunction with an example of a hologram of blood.

As mentioned previously, in the VELOSTAT scene we implement a proof-of-concept auto-calibration for the VELOSTAT. This auto-calibration technique works as follows: the application assumes that no pressure will be applied to the VELOSTAT for five seconds, and during that five seconds pressure data is collected from the VELOSTAT, and an average "default pressure" is calculated from the mean of this data set. Pressure is then calculated via percent-difference with that default pressure and current pressure.

Other General Improvements

We restructured and organized our UNITY codebase, and we added debugging functionality and automation to the code. For instance, our Bluetooth code automatically attempts to connect and re-connect to the smart moulage instead of waiting for user input. In restructuring our code, we implemented different debug tools. For instance, there is a universal "debug" flag that, when set and triggered, enables console logging to a degree specified by the developer ranging from error logging to verbatim logs of function calls, Bluetooth messages being sent and received, and when ARToolKit finds or loses a marker.

MIXED REALITY TOOLKIT Integration

We integrated MICROSOFT'S MIXED REALITY TOOLKIT, mainly so that our HOLOLENS software can relay information to a user outside of MICROSOFT VISUAL STUDIO'S debug console. The dialog boxes in the MIXED REALITY TOOLKIT allow us, for instance, to inform a user whenever the Bluetooth connection fails, or if ARToolKit fails to start due to lack of camera permissions. If fatal application errors occur, the dialogues in the MIXED REALITY TOOLKIT allow us to report to a user what had occurred, which makes debugging easier for certain bugs that only occur in rare circumstances. These dialog boxes only appear in developer builds of the software and would not appear if the application is built for release deployment. The MIXED REALITY TOOLKIT also presents us with tools that may be useful in future versions of the prototype HOLOLENS software. For instance, spatial mapping can be useful for helping develop a realistic blood fluid representation, as blood particles can interact with the environment around it (e.g., accumulate on the floor underneath the patient).

Hardware Cleanup

We worked on cleaning up the hardware for our instrumented moulage so that it can be robustly demonstrated. The first step of this process was to integrate all our core components on a protoboard instead of a breadboard, and solder all the components together. We also routed all connections to the IMU and VELOSTAT to a single header found at the bottom of the board, so that we may look towards using a single cable to connect the instrumented moulage and the board.

We did some research as to what we could use as a small footprint battery to power this board. We decided to use a 3.7 lithium polymer (LiPo) battery to accomplish this, in conjunction with a combined 5V step-up and battery charging component.

We continued to clean up the hardware for our instrumented moulage. We continued the process of integrating the rest of the components and solder all the components together. We connected a 3.7 LiPo battery in conjunction with a combined 5V step-up and battery charging component.

Performance Evaluation

Informal Evaluation of Marker Tracking Methods

In June we investigated tracking methods, and within our results we noticed that tracking methods such as VUFORIA'S IMAGETARGET and VISIONLIB'S POSTERTRACKING did not perform well due to the complexity of the markers required. Hence, our first goal was to find an image tracking library that does not require such complex markers. We found three of interest: ARUCO, ARToolKit, and VUFORIA'S VUMARKS.

VUFORIA's VUMARKS at first seemed to be the most promising approach. VUMARKS replaced FrameMarkers in recent versions of VUFORIA and seemed to promise a modern API which implemented a marker tracking system that we desired. VUMARKS performed better than ImageTargets in terms of being detected by a camera. Yet, further testing with this API yielded that VUMARKS are rather bad at being detected at a distance, as well as in varying lighting conditions.

A HOLOLENS version of ARToolKit was developed by Long Qian at John Hopkins University and offers a tracking speed of on average 25 to 30 frames per second. Upon testing, ARToolKit proved to be the top contender for what we wanted out of the image tracking library, as it was able to track markers at a considerable distance, tracked relatively well in darker lighting conditions, and offered a lot of API flexibility. ARToolKit also worked well with smaller markers around 1 inch in area.

ARUCO, while similar in architecture to ARToolKit, failed to be a viable option due to its reduced performance on the HOLOLENS. ARToolKit offers a faster tracking speed on the HOLOLENS, and the HOLOLENS version of ARUCO has not been maintained in over two years (e.g., corroborated by Long Qian at John Hopkins University).

Formal Evaluation of ARToolKit versus VUFORIA

We performed a comparative evaluation of ARToolKit and VUFORIA using the experimental method and setup that we had developed earlier. We set up a tracking environment consisting of a Microsoft HOLOLENS and a professional optical tracking system (OPTITRACK Duo), the latter of which provides sub-millimeter precision and accuracy. We tested the most recent versions of VUFORIA and ARToolKit as described above.

An experimental setup at UCF was assembled showing the HOLOLENS set up on a Styrofoam head, distance indicators on the table in front of the HOLOLENS, where we tested visual markers (VUFORIA and ARToolKit) at different distances, while we also attached an OPTITRACK 6 DOF target to the markers to track them with a professional high-precision optical tracking system. An OPTITRACK 6 DOF infrared retro-reflective targets was attached to ARToolKit (left) and VUFORIA (right) markers. We chose the ARToolKit marker as it was the default marker for this tracking system. We made sure that the passive infrared parts did not affect the RGB camera of the HOLOLENS that both VUFORIA and ARToolKit use. Both markers had a size of 5 cm×5 cm with a white frame of 1 cm.

We compared the tracked distances provided by ARToolKit and VUFORIA at distances from 0.33 m to 2.33 m in steps of 0.33 m. We tested the two systems one after another using the same HOLOLENS, since both cannot access the HOLOLENS' camera at the same time, and we wanted to avoid errors potentially caused by using different HOLOLENS units or different frames of reference. At each distance, we positioned the marker facing straight at the HOLOLENS and we held it in our hand, while moving it slowly (up/down and left/right) and rotating it slowly (yaw, pitch, roll) in a range of +/−5 cm and +/−15 degrees. We kept the center of the marker always at the same distance from the HOLOLENS for each of the seven distances as indicated on the table. The process was checked for validity considering ground truth provided by the OPTITRACK professional tracking system.

Figure 14:
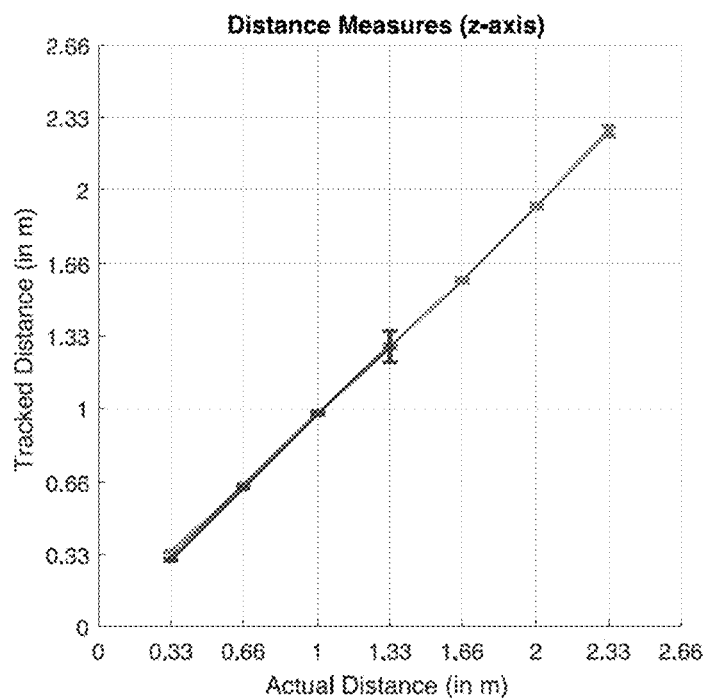
FIG. 14 shows results of the comparison between VUFORIA (blue) and ARToolKit (green). The error bars show the standard deviation. The x-axis shows the actual distances; the y-axis shows the tracked distances.
Figure 15:
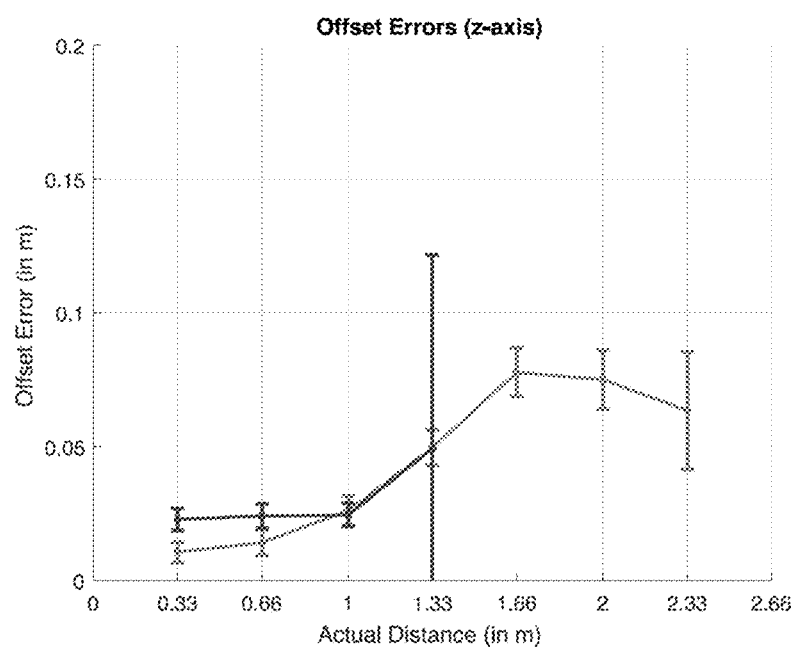
FIG. 15 shows a plot of the relative differences (offset errors) between the tracked distances and their actual distances.

The results of the comparison between VUFORIA (blue) and ARToolKit (green) are shown in FIGS. 14 and 15. The error bars show the standard deviation. In FIG. 14, the x-axis shows the actual distances; the y-axis shows the tracked distances. FIG. 15 provides a detailed plot of the relative differences (offset errors) between the tracked distances and their actual distances. The results on the y-axis indicate that VUFORIA provides reasonable results for closer distances, while it shows large errors at 1.33 m, and does not provide results beyond that distance. ARToolKit shows reasonable results for the entire tracked range. Mean error offsets are below 0.1 m, while the offsets and standard deviations increase over distance.

Figure 16:
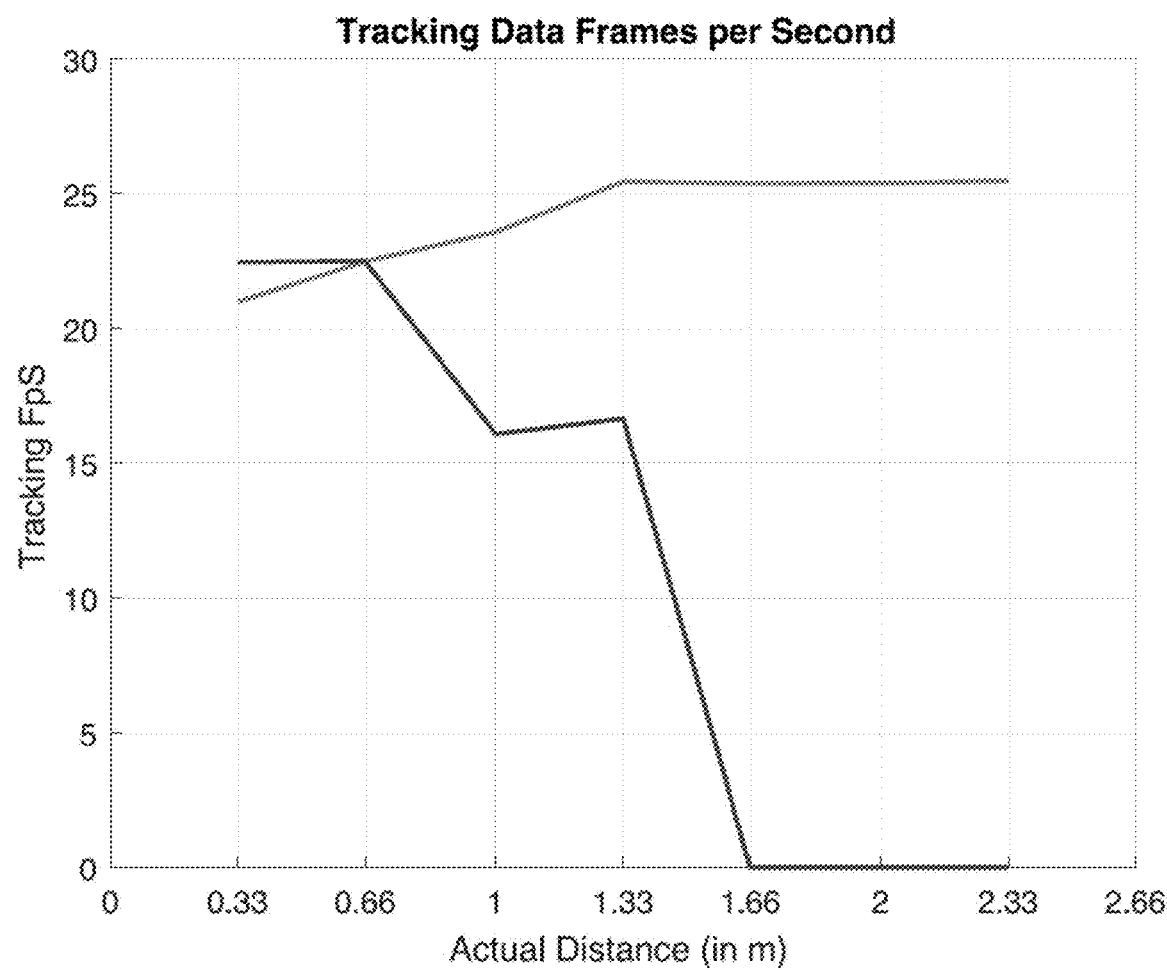
FIG. 16 shows overall frames-per-second for VUFORIA (blue) and ARToolKit (green). Both of them did not reach 30 fps. VUFORIA did not provide any tracking data for 1.66 m and beyond. ARToolKit provided more data over longer distances.

FIG. 16 shows the tracking performance in terms of frames per second in which we received tracking data from VUFORIA and ARToolKit. As stated before, we did not receive any tracking data for 1.66 m distance or beyond for VUFORIA. We did not expect to see ARToolKit providing such reasonable data for the longer distances. FIG. 16 demonstrates overall tracking frames-per-second for VUFORIA (blue) and ARToolKit (green). Both did not reach 30 fps. VUFORIA did not provide any tracking data for 1.66 m and beyond. ARToolKit provided more data over longer distances.

Overall, our test data suggests that the new version of ARToolKit provides reasonably good tracking data for a visual marker tracking system. It does not work with colored markers and image markers as does VUFORIA, but, considering the quite reasonable results, we believe that it is worth using ARToolKit since VUFORIA is only reasonably stable for up to one meter. If, for instance, the casualty (mannequin) is lying on a table, the VUFORIA system should work well, while it would lead to large tracking errors if the casualty is lying on the floor and the user is standing or kneeling at its side. However, the tradeoff is that the markers will not look as good as with VUFORIA.

Formal Evaluation of ARToolKit versus IMU

We designed a study to evaluate the IMU in comparison to marker-based tracking (i.e. ARToolKit) and ground truth as measured by an OPTITRACK V120:TRIO, a professional IR-based tracking system.

Testing and Initial Study Design

Our test tracked device incorporated all three tracking sources in a single tightly coupled single object so that we would be able to collect synchronized, comparable data from each tracking method simultaneously. To this end, we used a standard configuration OPTITRACK rigid body marker comprising four retroreflective spheres, an ARToolKit marker in the center of the plane of the OPTITRACK markers, and finally we rigidly affixed the IMU to the center of the back, directly behind the ARToolKit marker. We also added some simple physical shafts for the ability to manually rotate the objects in each of the 3 basis axes (X, Y, Z) independently.

We tested the orientation data streaming for the setup with seven ecologically useful distances. Using OPTITRACK's Motive software, the rigid body tracking data is streamed via the network to UNITY and running on the HOLOLENS to perform the ARToolKit tracking as well as receive the IMU data via Bluetooth. This includes an additional step to convert the OPTITRACK rigid body 6-DoF pose from Motive's coordinate system to UNITY's. We are still in the process of implementing a necessary calibration step for adjusting the IMU rotation data to the same common reference frame as the ARToolKit and OPTITRACK data.

Finalized Evaluation Design

The idea behind this study was to understand the uses of an IMU as a means to support optical marker tracking (e.g., ARToolKit or VUFORIA), and to compare the performance in different tracking situations. With a 9-axis IMU based on 3-axis gyroscopes, accelerometers, and magnetometers, we expect to see more stable and accurate orientation information compared to optical marker tracking, in particular due to the fact that the IMU is unaffected by occlusion and lighting issues. We described the initial design for this study in last month's report. We performed the IMU evaluation in March. In this section, we present the materials, methods, results, and discussion.

Materials

We performed the study at our SREAL laboratory at UCF using an experimental setup consisting of the following components:
- OPTITRACK V120: Trio, professional infrared (IR) based tracking system, consisting of three calibrated IR cameras, mounted on a tripod-this system provided "ground truth" pose measurements,
- Microsoft HOLOLENS head-mounted display, mounted on a Styrofoam head,
- ARDUINO Micro, mounted on a rigid wooden plate, to which we attached an Adafruit BNO-055 IMU, a standard 5 cm×5 cm ARToolKit marker, and a predefined OPTITRACK rigid body with four retro-reflective markers.

On the software side, we used our latest running UNITY version 2017.4.8f1 environment with the most recent ARToolKit for HOLOLENS version to track the marker with 6-DOF tracking data. We streamed the IMU's 3-DOF tracking data from the ARDUINO to the UNITY application running on the HOLOLENS using our previously developed Bluetooth code. We further streamed the OPTITRACK 6-DOF tracking data from a dedicated server workstation to UNITY. We timestamped the tracking data by OPTITRACK, ARToolKit, and IMU, and logged everything in UNITY coordinates.

An ARToolKit marker, OPTITRACK 6-DoF target (retroreflective markers), and IMU (attached to the ARDUINO) were mounted together as a rigid body for the performance evaluation.

Methods

We used a 2×3×7 design for this performance evaluation. Our factors are described in the following:
Tracking method (2 levels): ARToolKit and IMU
Rotation direction (2 levels): pitch, roll, and yaw
Distance to HOLOLENS (7 levels): 0.33, 0.66, 1, 1.33, 1.66, 2, 2.33 meters
The conditions are described in detail below.

Tracking method. We used either the ARToolKit optical marker tracking with the HOLOLENS' color camera to track the 5 cm×5 cm standard marker, or the IMU mounted rigidly on the same marker. As ground truth, we calibrated each of them to a professional OPTITRACK tracking system, which is hence not listed as a separate tracking method but rather is the standard to which we compared the two other methods to assess their accuracy.

Rotation direction. Starting from an orientation in which the marker was facing directly at the HOLOLENS, see FIG. 9, i.e., in full view of the HOLOLENS' camera, we rotated the marker around each of the three axes (X, Y, Z as shown in the figure) by two full 360-degree rotations. By performing these rotations, we hence tested the entire range from 0 to 360 degrees for all three orientation directions pitch (X), yaw (Y), and roll (Z). For pitch and yaw rotations, it is technically impossible for the camera-based ARToolKit marker tracking to provide data beyond a 90-degree rotation (clockwise or counterclockwise) from the start orientation facing towards the HOLOLENS. For roll rotations, however, this limitation is not present as the marker is always facing towards the HOLOLENS. The IMU is not affected by the self-occlusion of the marker, hence we expect to get full 360-degree data for each of the three axes for the IMU.

Figure 17:
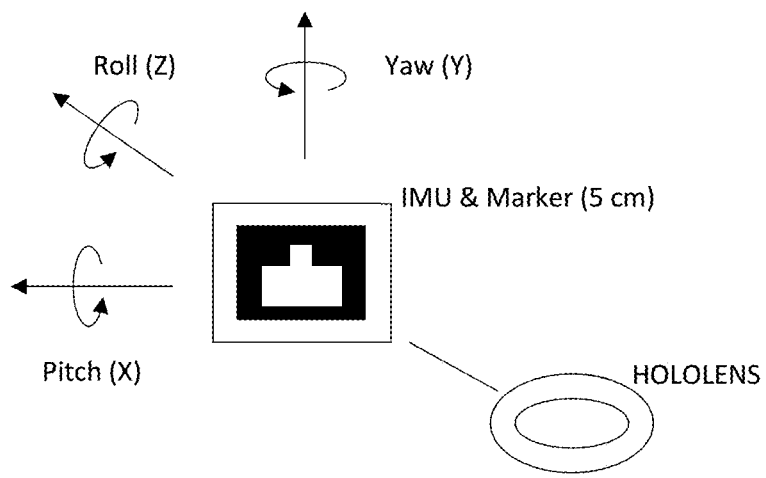
FIG. 17 is a diagrammatic illustration of the rotation directions showing the ARToolKit marker.
Figure 18:
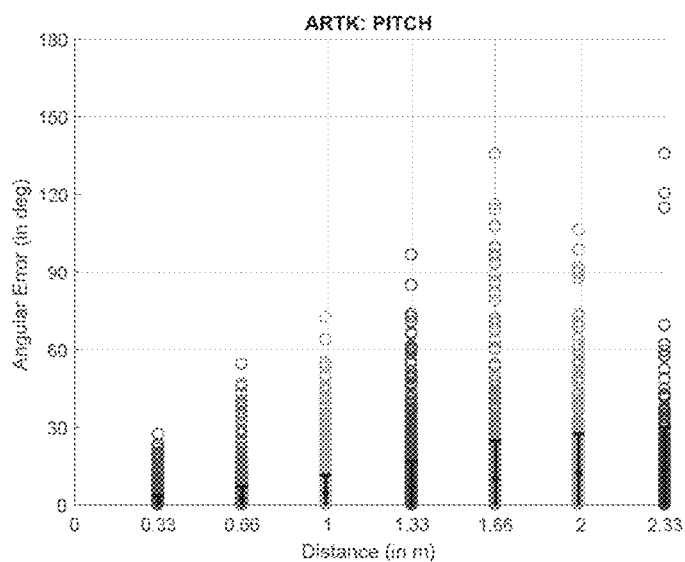
FIGS. 18 and 19 compare results for the ARToolKit ("ARTK") versus the IMU for pitch. Each plot shows the distance (in meters) to the HOLOLENS on the x-axis, and the angular error (in degrees) of the tracking data points on the y-axis.

FIG. 17 is an illustration of the rotation directions showing the ARToolKit marker. We started from an orientation in which the marker was facing straight at the HOLOLENS in full view. We then rotated the marker around one of the three axes in space. We rotated the marker by two full 360-degree rotations around each of the three axes (i.e., X, Y, Z).

Distance to HOLOLENS. Using the same experimental setup as in the previous comparison of ARToolKit and VUFORIA we tested a maximum range of up to 2.33 meters from the HOLOLENS. We started at a distance of one-third of a meter and tested the range in steps of 0.33 meters (i.e., 0.33, 0.66, 1, 1,33, 1.66, 2, 2.33 meters). We expect the tracking accuracy of ARToolKit to decrease for increasing distances to the HOLOLENS' camera, while the IMU data should be unaffected by the distance to the HOLOLENS; that is, as long as it remains within ten meters Bluetooth range to the ARDUINO.

Procedure and Analysis

For each of seven distances to the HOLOLENS we held the rigid body (with the ARToolKit marker, IMU, and OPTITRACK markers) at the distance indicator. We started the logging via a button press on an Xbox controller paired with the HOLOLENS. For each of the three rotation directions, indicated in FIG. 17, we then performed two full 360-degree rotations by slowly rotating the rigid body by hand around the corresponding rotation axis. Each of those was performed over an interval of approximately 30 seconds. We logged the tracking data from all three systems (ARToolKit, IMU, and OPTITRACK) for these rotations at the same time and we saved it to a log file on the HOLOLENS.

We analyzed the performance in Matlab based on the logged information for the two tracking methods, two rotation directions, and seven distances to the HOLOLENS. As expected, ARToolKit provided far fewer tracking data points than the IMU, such that we opted for the following analysis. We calibrated the orientation data for ARToolKit and the IMU separately to the OPTITRACK system using their initial coordinate frames. For each new tracking data point provided by ARToolKit or the IMU, we looked up the closest timestamped data point from the professional OPTITRACK tracking system. We considered the OPTITRACK performance as the ground truth in this evaluation. If there was no data point for OPTITRACK within the limits of its frame rate, we excluded the data point from the analysis.

The results shown in the following section thus provide indications on the accuracy of the tracking data points provided by ARToolKit and the IMU, while their frequency is dependent more on the sampling frame rate of the HOLOLENS' camera, Bluetooth, etc.

Results and Discussion

The ARToolKit results show the expected distribution of angular errors that increase for increasing distances to the HOLOLENS' camera, in particular when the marker surface is angled towards the HOLOLENS. For the tested roll rotations, we observed a more consistent pattern of errors over the tested range of distances, which is mainly related to the point that the marker was always faced straight at the HOLOLENS' camera, such that the errors were mainly affected by its resolution and the image space of the marker. For roll rotations, the tracking difficulty was hence comparatively low. In contrast, for the pitch and yaw rotations, we see that the errors increase largely for larger distances to the HOLOLENS. The main causes for this effect additionally to the reduced image space are the angled marker and differences in relative lighting (e.g., light in the real world usually comes from above not below). The distances had a strong effect on angular errors, which increased from the closest tested distance of 0.33 meters (pitch: M=1.26 deg; yaw: M=1.30 deg) to 2.33 meters (pitch: M=13.49 deg; yaw: M=17.07 deg). In addition to the increase in mean errors for larger distances, we further see that the variance and magnitude of outliers increase.

In summary, the ARToolKit results are reasonably good when the marker is oriented straight at the HOLOLENS' camera and/or placed very close to the HOLOLENS. In comparison, the IMU shows far better results for longer distances, both in terms of fewer extreme outliers as in terms of the overall mean errors. Moreover, due to the 9-axis sensors in the IMU, we did not see error propagation or drift over the course of the evaluation, as would be typical for pure 3-axis accelerometers or gyroscopes.

TABLE 1

Mean angular errors when ARToolKit provided tracking data for the marker. ARToolKit provided data only for a rotation of the marker of up to +/−60 degrees facing away from the HOLOLENS. These values only consider the errors compared to the ground truth when a marker was actually tracked.

| Cond: | Distance: | | | | | | |
|---|---|---|---|---|---|---|---|
| | 0.33 | 0.66 | 1 | 1.33 | 1.66 | 2 | 2.33 |
| Mean Pitch Error: | 1.26 | 2.73 | 4.60 | 6.91 | 9.98 | 12.16 | 13.49 |
| Mean Roll Error: | 6.93 | 8.76 | 6.03 | 6.42 | 6.45 | 6.28 | 7.30 |
| Mean Yaw Error: | 1.30 | 2.89 | 5.09 | 9.75 | 14.44 | 11.31 | 17.07 |

TABLE 2

Mean angular errors when the IMU provided tracking data for the marker. The IMU provided data for the entire 0-360 degree range for each of the three axes, independently of the distance to the HOLOLENS.

| Cond: | Distance: | | | | | | |
|---|---|---|---|---|---|---|---|
| | 0.33 | 0.66 | 1 | 1.33 | 1.66 | 2 | 2.33 |
| Mean Pitch Error: | 5.73 | 5.91 | 5.97 | 6.14 | 6.17 | 6.31 | 5.86 |
| Mean Roll Error: | 10.45 | 7.02 | 7.98 | 8.40 | 8.49 | 8.07 | 8.44 |
| Mean Yaw Error: | 4.07 | 2.36 | 4.75 | 3.85 | 2.44 | 2.13 | 2.29 |

Formal Evaluation of ARToolKit Marker Sizes

The idea behind this evaluation was to test different marker sizes using the optical marker tracking system that had shown better results in the previous evaluation, i.e., using ARToolKit instead of VUFORIA. Since the tracking quality of the 5 cm×5 cm marker used in the previous ARToolKit evaluation already provided comparatively good results over a distance of 2.33 meters, we were looking specifically at trying to understand what happens when we reduce the size of the marker. In the following, we present the materials, methods, results, and discussion.

Materials

We performed the study using the experimental setup for the IMU evaluation described above. We used the same hardware and software setup. However, we varied the rigid body and size of the ARToolKit marker. In particular, we mounted the marker on a protractor with a fixed base to stand on the surface.

Inventors aimed for static orientations and not dynamic rotations, such that we opted to use a static setup with a protractor underneath the ARToolKit marker. We rotated it from −60 degrees to +60 degrees in 30-degree increments.

Material

We used a 4×5×7 design for this marker size evaluation. Our factors are described in the following:

Marker size (4 levels): 5 cm, 4 cm, 3 cm, and 2 cm (square markers; marker width matched its height)

Marker orientation (5 levels): −60 deg, −30 deg, 0 deg, 30 deg, 60 deg (angles indicating yaw orientations; 0 degrees indicates that the marker is facing straight at the HOLOLENS)

Distance to HOLOLENS (7 levels): 0.33, 0.66, 1, 1.33, 1.66, 2, 2.33 meters

Details on the conditions are provided below. We used the same distances as for the IMU performance evaluation described above.

Marker size. We used markers of size 5 cm×5 cm previously as a tradeoff between tracking accuracy and size, which showed reasonably accurate results in the previous studies. In pilot tests, we further observed that markers with a width and height of just 1 cm did not provide stable tracking performance over the described distances. Hence, we decided to test marker sizes between 5 cm and 2 cm in steps of 1 cm.

Marker orientation. In the orientation evaluation comparing the ARToolKit and IMU solutions, we found that the system mainly provided data points for an angle of up to approximately 60 degrees from facing straight at the HOLOLENS' camera. Hence, in order to understand how the marker size affected tracking performance over this range, we chose to test them in discrete steps. We opted to test them in steps of 30 degrees from −60 to +60 degrees. Due to the similarities observed between the performance for the rotation axes in the comparative IMU-ARToolKit performance evaluation above, we chose to focus on yaw orientations over this range.

Procedure and Analysis

For each distance, we placed the rigid body at the corresponding distance from the HOLOLENS. We then oriented it to match the intended orientation (and precise distance) from the HOLOLENS using a live preview of calibrated tracking data provided by the OPTITRACK professional IR based tracking system. We then started the logging of the ARToolKit tracking data on the HOLOLENS using a paired Xbox controller. We recorded tracking data for a total of three seconds per condition. We saved the log files on the HOLOLENS. We analyzed the results in Matlab by computing the tracked distances (i.e., we were not focusing on orientations as these were covered mainly in the previous evaluation and suggested large performance benefits for the IMU over ARToolKit) and the frame rate provided by ARToolKit running on the HOLOLENS in the different conditions.

Results and Discussion

FIGS. 30-33 show the results for the different conditions. The x-axes show the actual distance of the marker from the HOLOLENS, and the y-axes show the tracked distance provided by ARToolKit. The plots show the means and the error bars show the standard deviations. We did not see any difference in the results for negative and positive angles and decided to pool the results for these (symmetrical) angles. Hence, the colored lines show the results for 0 degrees, 30 degrees, and 60 degrees yaw angles to the HOLOLENS, with the marker facing straight at the HOLOLENS in the 0-degree condition. Not all the orientations and marker sizes result in tracking information provided by ARToolKit. If no data is provided for one of them, it indicates that we did not receive any output from ARToolKit.

Table 3 shows the ARToolKit frame rates for the different marker sizes, orientations, and distances. As can be seen, we did not receive tracking data points for some of the conditions. Overall, the frame rate was reduced and the probability for missing data points was increased for smaller marker sizes, and increased angles with the marker pointing away from the HOLOLENS.

| Cond: | | Distance: | | | | | | |
|---|---|---|---|---|---|---|---|---|
| | | 0.33 m | 0.66 m | 1 m | 1.33 m | 1.66 m | 2 m | 2.33 m |
| 5 cm | 0 degrees | 24.2 | 28.8 | 28.2 | 28.6 | 28.6 | 20.0 | 25.1 |
| | 30 degrees | 22.7 | 30.0 | 29.5 | 29.6 | 28.7 | 14.8 | 15.5 |
| | 60 degrees | 25.9 | 30.0 | 29.0 | 0 | 28.6 | 0 | 0 |
| 4 cm | 0 degrees | 28.2 | 27.1 | 29.5 | 29.2 | 28.8 | 17.2 | 28.8 |
| | 30 degrees | 29.1 | 28.4 | 27.1 | 28.7 | 30.0 | 15.4 | 19.5 |
| | 60 degrees | 26.8 | 29.7 | 28.5 | 27.7 | 26.5 | 0 | 0 |
| 3 cm | 0 degrees | 24.9 | 12.6 | 25.3 | 30.0 | 15.3 | 17.0 | 19.2 |
| | 30 degrees | 26.2 | 30.0 | 30.0 | 26.9 | 19.0 | 20.1 | 14.7 |
| | 60 degrees | 27.7 | 28.3 | 28.0 | 28.3 | 29.3 | 28.4 | 0 |
| 2 cm | 0 degrees | 29.4 | 26.7 | 27.0 | 28.2 | 12.8 | 0 | 0 |
| | 30 degrees | 24.2 | 29.9 | 18.4 | 0 | 10.6 | 0 | 0 |
| | 60 degrees | 21.4 | 0 | 12.1 | 0 | 0 | 0 | 0 |

The results show that, matching the results from our previous comparative evaluation between ARToolKit and VUFORIA, the performance for the 5 cm×5 cm standard marker was comparatively good. For smaller markers, the errors in distance measures and the number of missing data points increased. For the 2 cm×2 cm marker, we did not receive any data points for the distances of 2 or 2.33 meters, even when the marker was facing straight at the HOLOLENS. Moreover, smaller markers showed increased problems tracking the marker when it was angled away from the HOLOLENS.

In general, we found that markers of 5 cm×5 cm were necessary to provide reasonable tracking data over the entire 2.33 meter range, while markers of size 4 cm×4cm and in part also markers of size 3 cm×3 cm could be tracked reliably over shorter distances of up to one meter. Markers of size 2 cm×3 cm only provided tracking data when very close to the HOLOLENS and when they were not angled away from the HOLOLENS' camera.

FIGS. 30-33 show results of the marker size evaluation. The plots show the results for 5 cm, 4 cm, 3 cm, and 2 cm markers, respectively. The x-axes show the actual distances of the markers, while the y-axes show the tracked distances. Optimal results would be aligned along the diagonal from the lower left to the upper right. We received no tracking data for some of the distances and orientations, which is shown in detail in Table 3.

Video Recordings

Year 1 Demonstration Video Recordings

In preparation for the video recordings, we cleaned up the hardware, created a larger moulage to fit on an arm or limb, embedded the technology into the mold, created 3D wounds and 3D blood. The size of the moulage can accommodate for using the full hand when applying pressure (instead of one finger). The smart moulage sends data to the HOLOLENS in which the software dynamically changes the visuals of the blood and of the 3D wound.

We prepared and shot a video at the University of Central Florida showing Dr. Frank Guido-Sanz using the prototype. We mounted one camcorder on the HOLOLENS, set up studio lights and camcorders on tripods, and one mobile camcorder in our professional HuSIS space in the SREAL laboratory to capture the action from different angles. We also set up a black background on the floor and on the tripods to avoid background distractors. We recorded videos with Dr. Frank Guido-Sanz where the moulage was positioned on a mannequin arm and a real human. The videos featured changing between the mannequin and the real human where the arm gets moved and the AR imagery follows. We also varied the shape of the wound (gunshot versus shrapnel) and varied whether Dr. Guido-Sanz was wearing a HOLOLENS. After the recording session, we synchronized the videos and edited a combined video.

We pilot tested different locations around our lab at different times of day and set up an outdoors video shoot with a live actor. We were able to show an outdoor view through the HOLOLENS (top) using random 3D objects to test the colors and brightness on the HOLOLENS, and (bottom) showing the augmented moulage on a live actor.

Glossary of Claim Terms

Augmented Reality (AR) means a form of virtual reality that augments a user's view of the real world with virtual content. Various mechanisms exist for carrying out the augmentation. One popular mechanism is to layer virtual information over a live camera feed of the real world fed into a headset known as a video see-through head-mounted display (HMD), possibly through a portable computing device. Alternatives include the use of optical see-through HMDs where the virtual content is layered over a direct view of the real as seen through an optical combiner system (combining real and virtual views); handheld augmented reality, for example via a mobile "smart" phone with a camera and a display; and spatial augmented reality (SAR) where the virtual imagery is displayed directly on (or as part of) real world objects, as opposed to in the user's visual field. One popular means for SAR is to use a digital projector to project imagery directly on an object, hence changing the appearance of the object. One specific method is that of Shader Lamps rendering (Raskar, Welch, and Fuchs), which is sometimes referred to as "projection mapping." These are just some examples of ways to achieve AR.

Communicatively Coupled means a data connection between one or more computing, sensor, storage, and/or networking devices wherein information is exchanged.

Computer Simulation Engine means the combination of computer processor(s) and software instructions to coordinate a medical simulation integrating both physical and computer-generated reactions to the actions of a trainee as detected by sensors and/or extrinsic controls (e.g., instructor control of simulation).

Corporeal means a tangible, physical object.

Dimensional means having enough depth and substance to be believable.

Haptic means the generation of a sense of touch by applying motions, vibrations, changes in temperature, changes in texture, changes in moisture or forces to a user.

Headset or Head-Mounted Display (HMD) is a head-worn device that provides virtual reality to the wearer. They often include a stereoscopic pair of display screens (frequently providing separate images for each eye), stereo sound capability, and head motion position and/or orientation tracking sensors, e.g., employing gyroscopes, accelerometers, or structured light systems.

Indicia (or Indicium) means signs, indications, or distinguishing marks. For the purposes of claim construction, an indicium (singular) does not preclude additional indicium (e.g., indicia or multiple orientation marks).

Manikin, a variation of "mannequin," is a term referring to the physical (typically robotic) form of the simulation of a human, typically jointed but may include only a portion of an entire body such as limbs, torso or the like. For the purposes of this invention, manikin may include non-human animal models useful for veterinary training.

Moulage means the process of applying mock injuries for the purpose of training medical personnel. Moulage may range from applying simple rubber or latex "wounds" over an actor portraying a patient to complex, simulated manikins having elements of realism such as vomit, blood, open fractures, and the like.

Optical means operating in or employing the visible part of the electromagnetic spectrum.

Sensor means a device or peripheral thereof that detects or measures a physical property and records, indicates, or otherwise responds to it.

Tactile means perceptible to touch.

Virtual Reality means a computer-generated scenario that simulates a realistic experience. Augmented reality systems are considered a form of VR that layers virtual content into the user's visual field using video or optical HMDs, smart phones, or directly in the scene as described above, optionally through a portable computing device.

Vital Signs means a group of important signs that convey the status of the body's vital functions. Examples of five primary vital signs include body temperature, blood pressure, heart rate, respiratory rate, and pain.

Wound means an injury to living tissue caused by a cut, blow, or other impact, typically one in which the skin is cut or broken but may also include those under intact skin. A wound may further encompass damage to living tissue from chemical, biological or environmental exposures.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A tactile, augmented reality anatomical feature simulation system comprising:
   a corporeal object deformable by physical manipulation, simulating physical and dimensional features of a body part initially in a first anatomical state;
   a first visual graphic overlay of an anatomical feature on the body part of the corporeal object, the first visual graphic overlay renderable via an augmented reality mechanism selected from the group consisting of video see-through headsets, optical see-through headsets, handheld augmented reality devices, and spatial augmented reality devices, the augmented reality mechanism producing an augmented reality rendering;
   whereby the first visual graphic overlay simulates the anatomical feature visually on the body part via the augmented reality mechanism according to the first anatomical state, the first visual graphic overlay consistent with the physiological characteristics of the anatomical feature when the body part assumes the first anatomical state;
   one or more reference indicia detectable by an optical sensor, the indicia fixed to the surface of the body part; and
   a computer processor communicatively coupled to the optical sensor and the augmented reality mechanism, the computer processor executing a software process using the indicia on the body part to dynamically locate, size and orient a visual graphic enhancement rendering of the anatomical feature on the body part whereby changes to positions or orientations of the one or more reference indicia caused by physical manipulation of the body part to a second anatomical state invoke the software process to reconstruct spatial and dimensional parameters of the visual graphic enhancement so that there is a spatial synchronization of the augmented reality rendering to the second anatomical state of the body part, the software process further modifying the characteristics of the first visual graphic overlay of the anatomical feature to a second visual graphic overlay associated with the second anatomical state, the modified characteristics of the second visual graphic overlay consistent with the physiological characteristics of the anatomical feature when the body part assumes the second anatomical state.

2. The system of claim 1 wherein the difference between the physiological characteristics of the anatomical feature in the first anatomical state and the second anatomical state is the anatomical feature shape.

3. The system of claim 1 wherein the difference between the physiological characteristics of the anatomical feature in the first anatomical state and the second anatomical state is the relative anatomical feature dimensions.

4. The system of claim 1 wherein the difference between the physiological characteristics of the anatomical feature in the first anatomical state and the second anatomical state is a rate of visually simulated fluid flow emitted from the anatomical feature.

5. The system of claim 4 wherein the fluid flow is visually simulated blood.

6. The system of claim 1 wherein the corporeal object includes a visually overlaid human face and the software process further invokes a visually simulated emotional expression when the body part assumes the second anatomical state.

7. The system of claim 6 wherein the visually simulated emotional expression invoked is one of pain.

8. The system of claim 6 wherein the visually simulated emotional expression invoked is one of comfort.

9. The system of claim 1 wherein the physical manipulation changing the body part from the first anatomical state to the second anatomical state is selected from the group consisting of rotation, elevation, articulation, compression, expansion, stretching, and pulling the physical manipulation changing the location or orientation of the indicia whereby the software process, using the indicia, adapts the visual graphic enhancement to a new topology of the body part responsive to the physical manipulation.

10. The system of claim 1 further comprising a plurality of predefined anatomical states of the body part detectable by one or more sensors on or within the body part, the sensors communicatively coupled to the computer processor wherein a first visual graphic enhancement within a plurality of visual graphic enhancements is associated with the first anatomical state of the body part and a second visual graphic enhancement is associated with the second anatomical state of the body part whereby the transition from first to second visual graphic enhancements is consistent with physiological characteristics of the anatomical feature responsive to sensor data.

11. The system of claim 10 wherein the one or more sensors on or within the body part detects a value selected from the group consisting of user proximity, mechanical pressure, temperature, sound, articulation and light.

12. The system of claim 1 further comprising a computer processor-controlled physical response to changes of the indicia positions or indicia orientations caused by the physical manipulation of the body part, the physical response invoked by an electronically actuated device causing the physical response selected from the group consisting of movement, sound, and fluid flow.

13. The system of claim 10 further comprising a computer processor-controlled physical response to changes in the sensor value, the physical response invoked by an electronically actuated device causing the physical response selected from the group consisting of movement, sound, and fluid flow.

14. The system of claim 1 further comprising a 3D model of the corporeal object accessible by the computer processor wherein the software process reconstructs the spatial and dimensional parameters of both the visual graphic enhancements and the 3D model of the corporeal object for the augmented reality mechanism wherein an optical image of the corporeal object is spatially and dimensionally aligned to the 3D model wherein the 3D model is rendered opaque or semi-transparent via the augmented reality mechanism.

15. The system of claim 1 further comprising a glove indicium on a trainee-worn glove that engages the body part and anatomical feature, the computer processor further accessing a 3D glove model wherein the glove indicium conveys the orientation, location and articulation of a trainee hand wearing the glove to dynamically align the 3D glove model with the trainee hand, wherein the computer processor chroma-keys the trainee-worn glove so that an optical image opacity for the 3D glove model is modified.

16. The system of claim 1 further comprising glove indicia on the glove that engages the body part and anatomical feature, the computer processor further generating a visual graphic enhancement over the glove simulating fluid.

17. The system of claim 1 further comprising a vital sign readout wherein the software process further invokes a change in values presented in the vital sign readout responsive to the body part assuming the second anatomical state.

18. The system of claim 1 further comprising a computer processor-controlled response by the physical corporeal object to a sensor-detected action.

19. The system of claim 12 wherein a response by the physical corporeal object is selected from the group consisting of movement, sound, and fluid flow.

* * * * *